US008457241B2

(12) United States Patent
Asanuma et al.

(10) Patent No.: US 8,457,241 B2
(45) Date of Patent: Jun. 4, 2013

(54) DIGITAL COMMUNICATIONS SYSTEM

(75) Inventors: Yutaka Asanuma, Tokyo (JP); Shigeo Terabe, Hachioji (JP); Kengo Kurose, Hamura (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 749 days.

(21) Appl. No.: 11/998,936

(22) Filed: Dec. 3, 2007

(65) Prior Publication Data

US 2008/0310544 A1    Dec. 18, 2008

(30) Foreign Application Priority Data

Jun. 18, 2007    (JP) .................................. 2007-160742

(51) Int. Cl.
*H04L 1/0003*    (2006.01)
(52) U.S. Cl.
USPC ........................................... 375/295; 375/296
(58) Field of Classification Search
USPC ............................................................. 375/295
See application file for complete search history.

(56) References Cited

U.S. PATENT DOCUMENTS

| | | | | |
|---|---|---|---|---|
| 5,671,156 A * | 9/1997 | Weerackody et al. | .......... | 714/52 |
| 5,917,864 A * | 6/1999 | Asahara | .......... | 375/344 |
| 5,983,174 A * | 11/1999 | Wong et al. | .......... | 704/228 |
| 6,081,778 A * | 6/2000 | Wong et al. | .......... | 704/227 |
| 2003/0036397 A1 * | 2/2003 | Takahashi | .......... | 455/502 |
| 2005/0166129 A1 * | 7/2005 | Yano et al. | .......... | 714/797 |
| 2006/0220926 A1 * | 10/2006 | Ito et al. | .......... | 341/50 |
| 2008/0025433 A1 * | 1/2008 | Deguchi | .......... | 375/295 |
| 2008/0250302 A1 * | 10/2008 | Wu et al. | .......... | 714/786 |

OTHER PUBLICATIONS

3GPP TS 25.212; 3$^{rd}$ Generation Partnership Project; Technical Specification Group Radio Access Network; Multiplexing and Channel Coding (FDD); 2005; pp. 2-72.
JP Office Action mailed on Mar. 26, 2013 in application No. 2007-160742.
Nokia Siemens Networks, "On the structure of the primary broadcast channel" 3GPP TSG RAN WG1#49 Meeting, Kobe, Japan, R1-072265, May 7-11, 2007.

* cited by examiner

*Primary Examiner* — Sam K Ahn
*Assistant Examiner* — Santiago Garcia
(74) *Attorney, Agent, or Firm* — Maschoff Brennan

(57) ABSTRACT

In a base station, after CRC is added to transmission data as a detection code, the transmission data is subjected to error-correcting coding using a convolutional code based on tail biting, divided into four frames of P-BCH and transmitted. For this reason, at a mobile station, even if reception (synthesis) is started from any frame of P-BCH represented as (b-1) to (b-4), a cyclic structure of the transmission signal is maintained due to the tail biting and reception data shifted by unit of frame can be obtained. For this reason, at the mobile station, even if a leading frame is unknown, decoding can be executed by one-time error-correcting decoding. A result of the decoding is subjected to CRC detection in four frame timings, the leading frame is detected and the transmission data is restored.

2 Claims, 23 Drawing Sheets

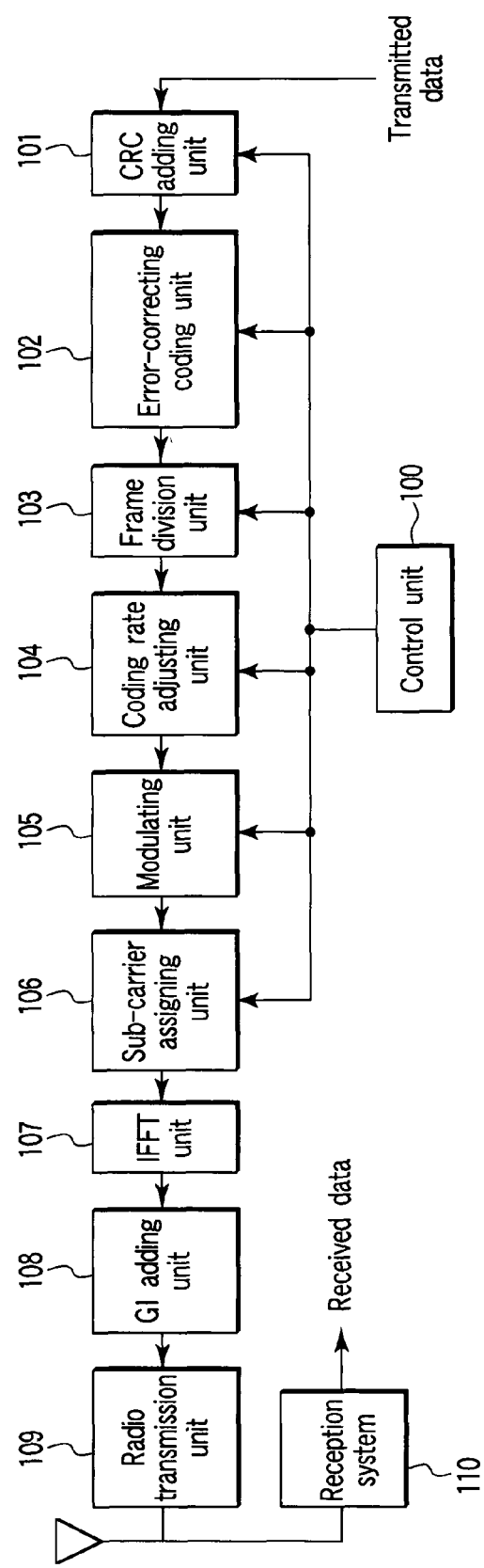
F I G. 5

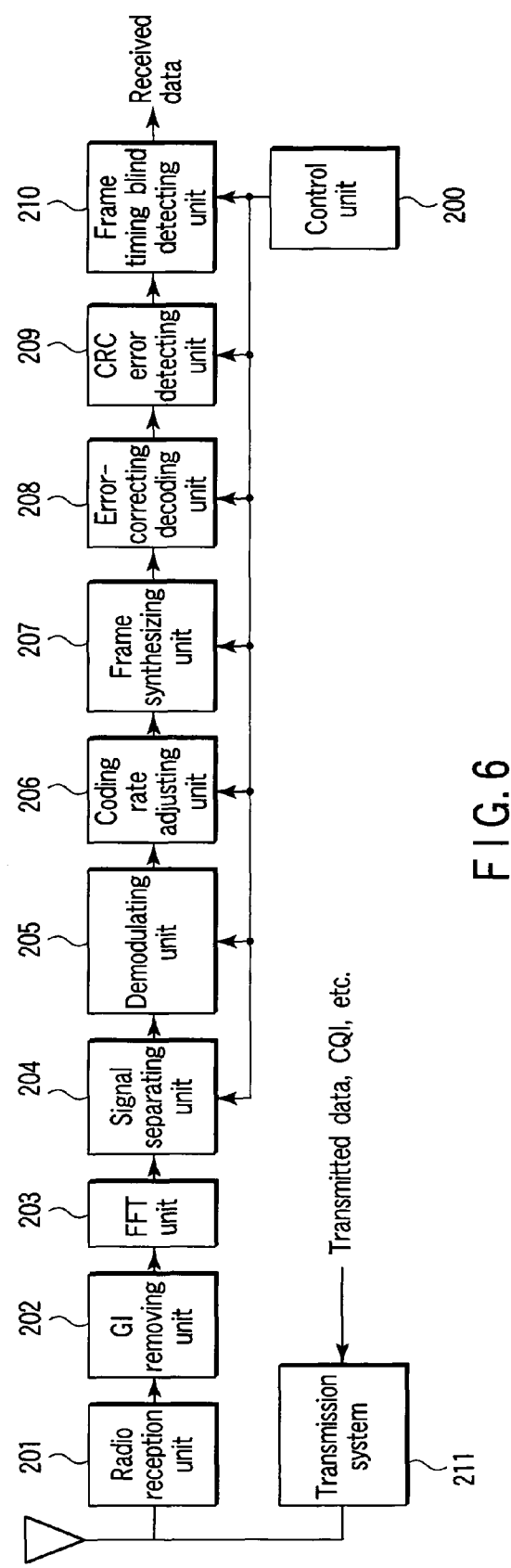
F I G. 6

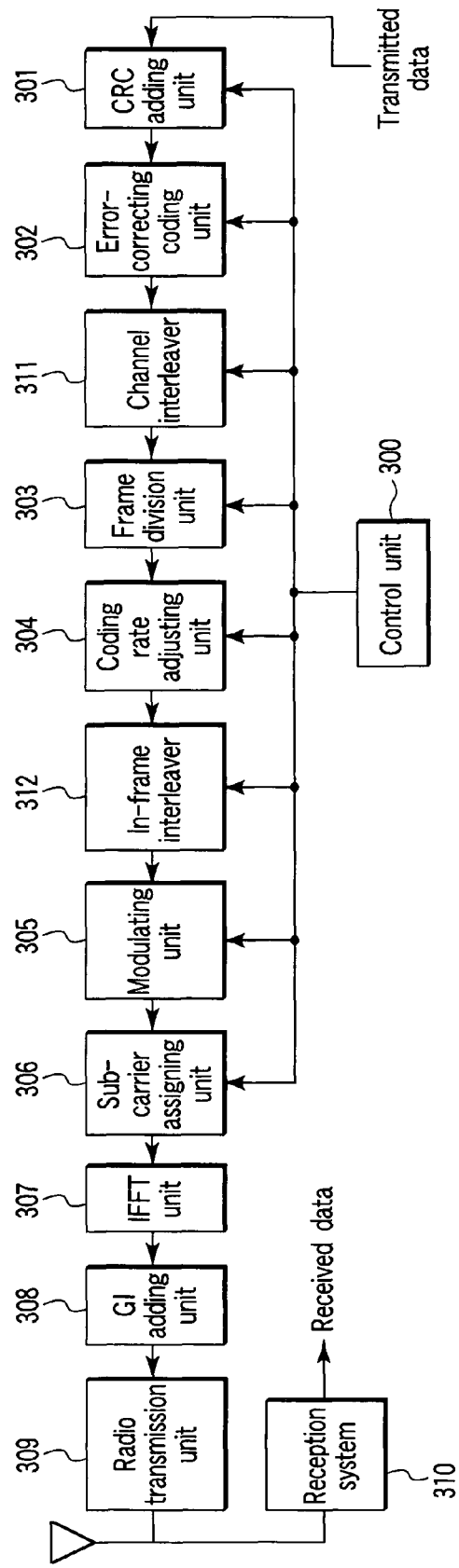
F I G. 12

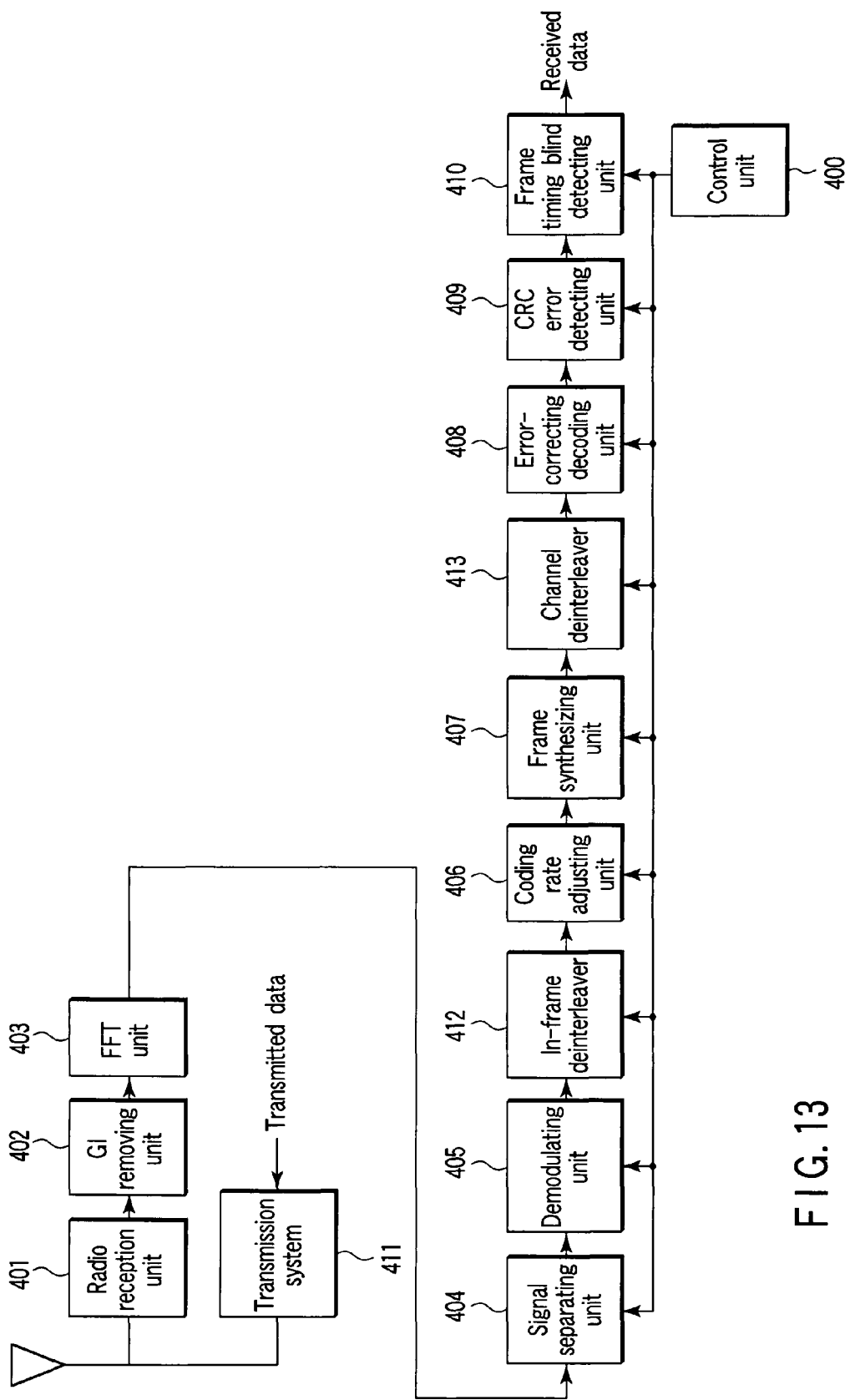
F I G. 13

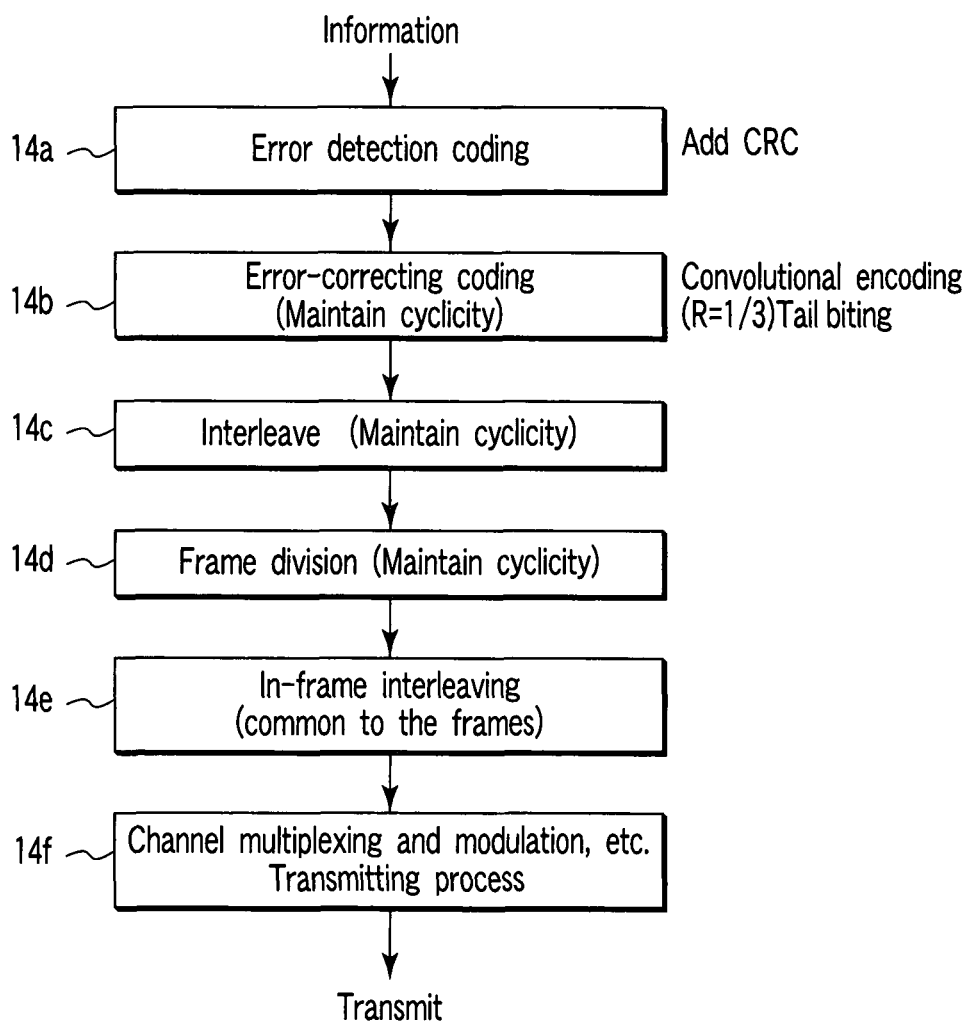
F I G. 14

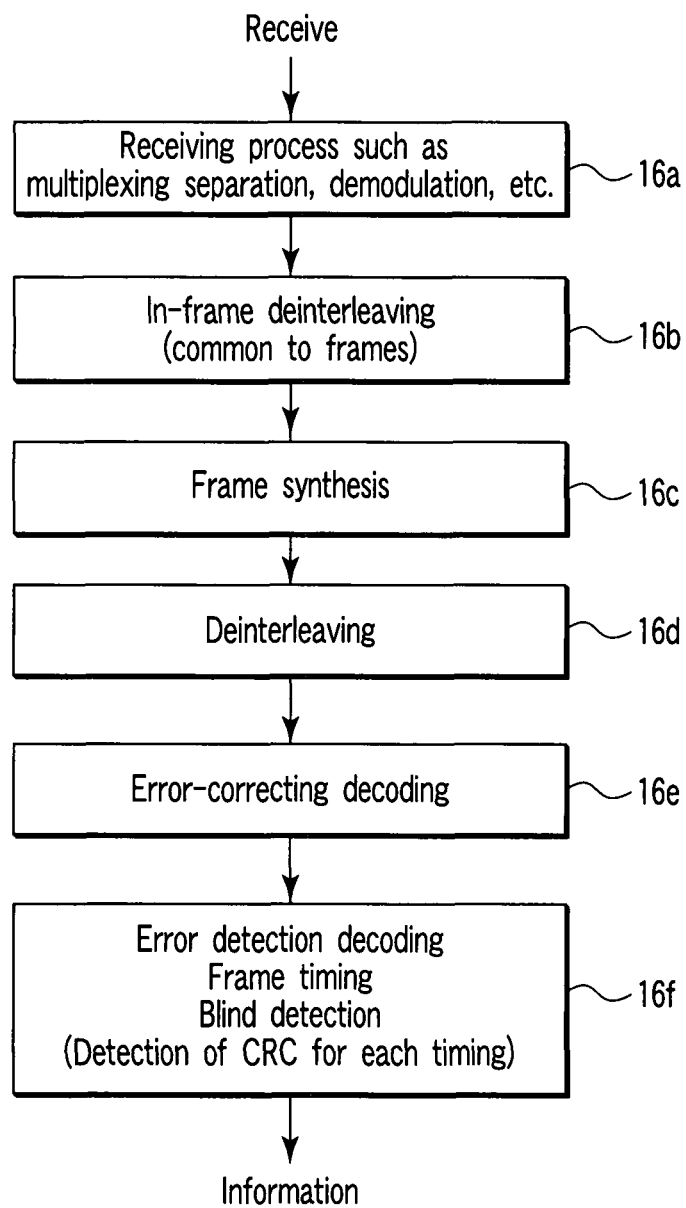
F I G. 16

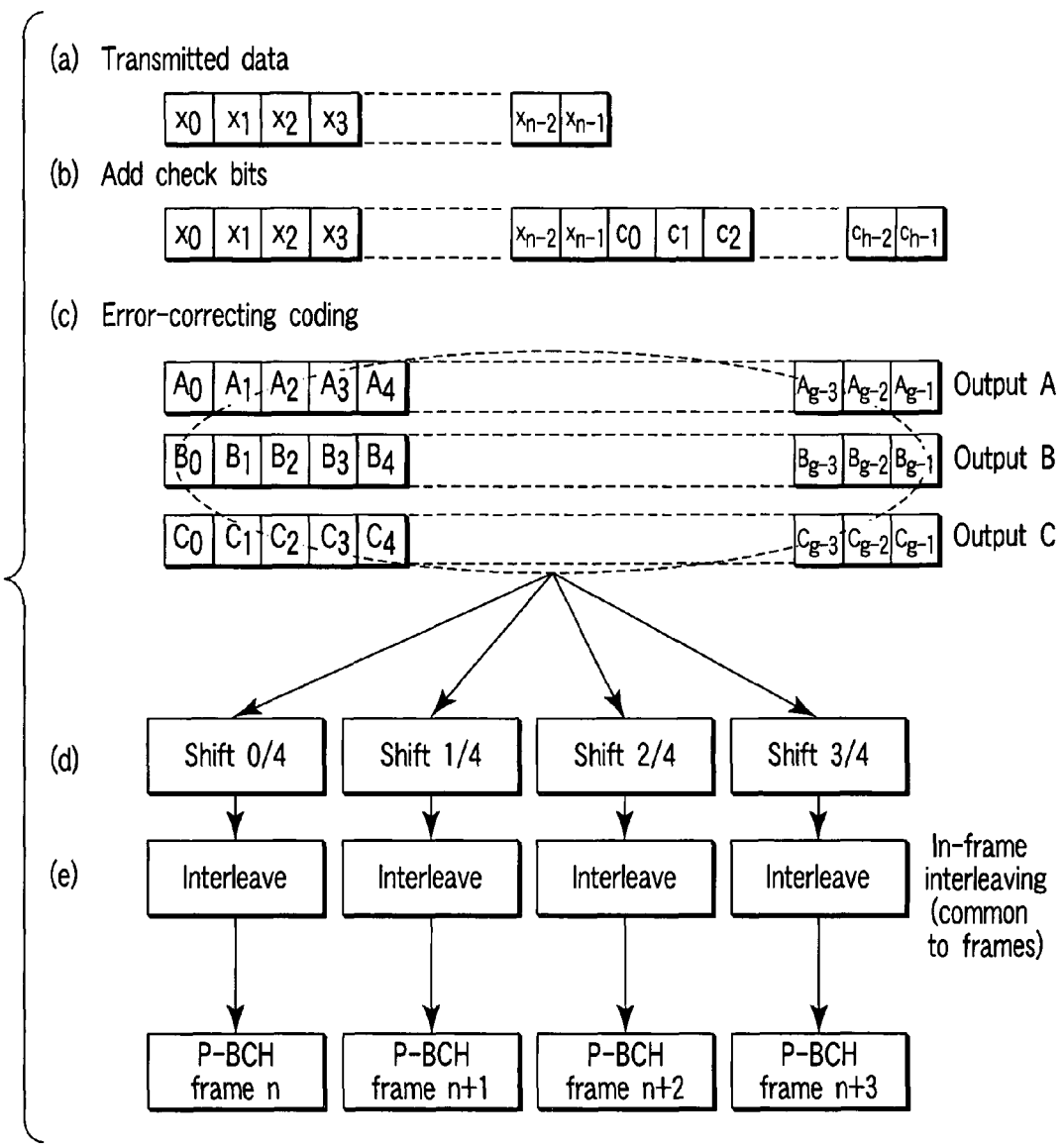
F I G. 22

DIGITAL COMMUNICATIONS SYSTEM

CROSS-REFERENCE TO RELATED APPLICATIONS

This application is based upon and claims the benefit of priority from prior Japanese Patent Application No. 2007-160742, filed Jun. 18, 2007, the entire contents of which are incorporated herein by reference.

BACKGROUND OF THE INVENTION

1. Field of the Invention

The present invention relates to a digital communications system for discriminating a start position of a transmission format on a receiving side.

2. Description of the Related Art

In some digital communications systems, data transmission is executed by arbitrarily selecting a transmission format from a plurality of transmission format candidates. In such a system, identification information of an employed transmission format is indicated to a receiving side by a transmitting side in some cases or often is not in the other cases.

In the latter cases, since the employed transmission format is not known to the receiving side, the transmission format needs to be detected with reference to a reception signal. This detection is generally called blind detection and is often executed in a receiving device of a W-CDMA system (cf., for example, 3GPP TS 25.212 V5.10.0 (2005-06) Annex A (informative): Blind transport format detection).

In 3GPP TS 25.212 V5.10.0 (2005-06) Annex A (informative): Blind transport format detection), a method of blind detection for a plurality of formats of different transmission data sizes is disclosed. A.1.2. Blind transport format detection using CRC that is disclosed therein executes error detection using CRC at a position corresponding to each of the formats while executing error-correcting decoding of a convolutional code and detects that a format in which correct CRC is detected, that is, no error is found is a transmission format.

However, since decoding of the error-correcting code needs to be started at the start position of the transmission format, this method can be applied only to a case where the start position of the transmission format is constant and the data size is varied according to the transmission format, but not to a case where there are a plurality of start positions of the transmission format.

An actual communications system may have a plurality of candidates for the start position of the transmission format. For example, if a set of transmission information is split into a plurality of frames and transmitted, it is unknown on the receiving side which frame of the information is first transmitted. Such a case is seen in an initial search of a cellular system.

In this case, the receiving side must execute error-correcting decoding for each of a plurality of candidates for the transmission formats that start at an unknown frame timing. For this reason, if blind detection of the transmission format is executed, processing a large amount of data is needed.

In short, the conventional digital communications system has a problem that if an unknown transmission format is subjected to blind detection and the transmission format has a plurality of candidates for the start position, processing a large amount of data is needed to detect the start position.

BRIEF SUMMARY OF THE INVENTION

The present invention has been accomplished to solve the above-described problems. The object of the present invention is to provide a digital communications system capable of detecting the start position of the transmission format without processing a large amount of data even if the transmission format has a plurality of candidates for the start position.

To achieve this object, an aspect of the present invention is a digital communications system for data transmission between a transmitting station and a receiving station. The transmitting station comprises: a first encoder which executes error detection coding of transmission data and generates data to be transmitted obtained by adding an error detection code to the transmission data; a second encoder which executes error-correcting coding for the data to be transmitted, with an error-correcting code corresponding to cyclicities of data to be encoded and data encoded; a frame dividing unit which divides the encoded data obtained by the second encoder into a plurality of frames; and a transmitter which transmits the data in each of the frames divided by the frame dividing unit. The receiving station comprises: a receiver which receives the data in the plurality of frames transmitted from the transmitting station; a first decoder which executes decoding corresponding to the error-correcting coding executed by the second encoder, for the data in each of the frames received by the receiver, and obtains data having a cyclicity corresponding to a cyclicity of the data to be decoded; a synthesizer which synthesizes the decoded data in the plurality of framers obtained by the first decoder; a second decoder which executes decoding corresponding to the encoding executed by the first encoder, for the data synthesized by the synthesizer, by setting a frame boundary as a leading part of the decoding; and a detector which detects a start position of the transmission data from the synthesized data, in accordance with a result of the decoding of the second decoder.

In the present invention, the transmitting station processes the transmission data additionally including the error detection code, by error-correcting coding using the error-correcting code corresponding to the periodicity of the data to be encoded and the data encoded, divides the transmission data into a plurality of frames and transmits them. The receiving station obtains the data having periodicity corresponding to the periodicity of the data to be decoded and synthesizes the reception data to a plurality of frames. The synthesized data are decoded by setting the frame boundary as a leading part of the decoding and the start position of the transmission data is detected from a result of decoding.

Therefore, the present invention can provide a digital communications system capable of detecting the start position of the transmission format without processing a large amount of data even if the transmission format has a plurality of candidates for the start position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram showing a configuration of a base station of the digital communications system according to a first embodiment of the present invention;

FIG. 6 is a block diagram showing a configuration of a mobile station of the digital communications system according to the first embodiment of the present invention;

FIG. 12 is a block diagram showing a configuration of a base station of the digital communications system according to a second embodiment of the present invention;

FIG. 13 is a block diagram showing a configuration of a mobile station of the digital communications system according to the second embodiment of the present invention;

FIG. 14 is a flowchart showing a flow of a process relating to information transmission at the base station shown in FIG. 12;

FIG. 16 is a flowchart showing a flow of a process relating to information reception at the mobile station shown in FIG. 13;

FIG. 22 is an illustration explaining transition of transmitted data in the flow shown in FIG. 21;

DETAILED DESCRIPTION OF THE INVENTION

Embodiments of the present invention will be described with reference to the accompanying drawings. As an example of the digital communications system, a downstream line of a cellular system represented by a portable telephone, i.e. a transmission line from a base station to a mobile station is explained.

The communications system according to the present invention employs an error-correcting-coding method using convolutional codes based on tail biting. For this reason, information to be encoded and a signal obtained by encoding correspond in periodicity. The convolutional codes based on the tail biting will be described below.

Figure 1:
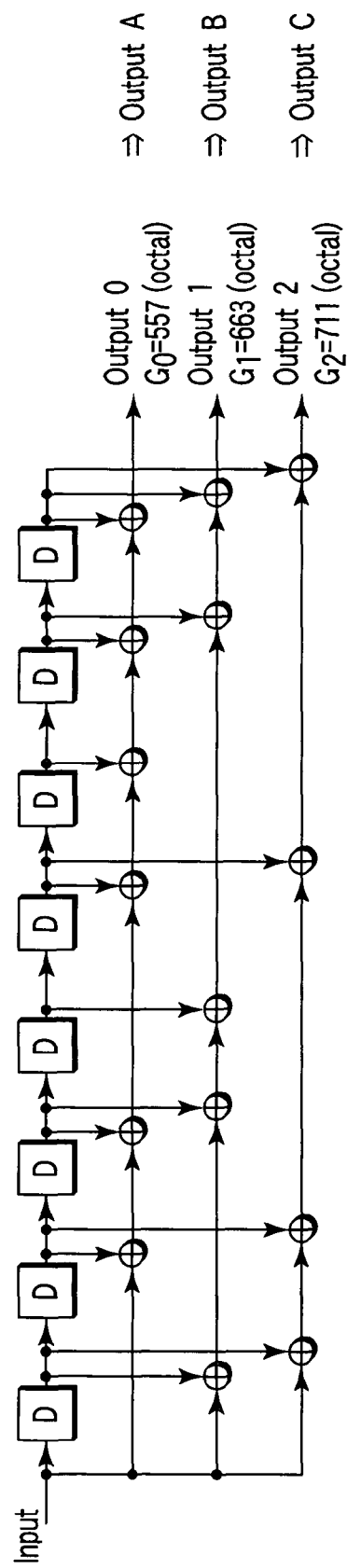
FIG. 1 is an illustration of a convolutional encoder employed on a transmitting side of a digital communications system according to the present invention.
Figure 2:
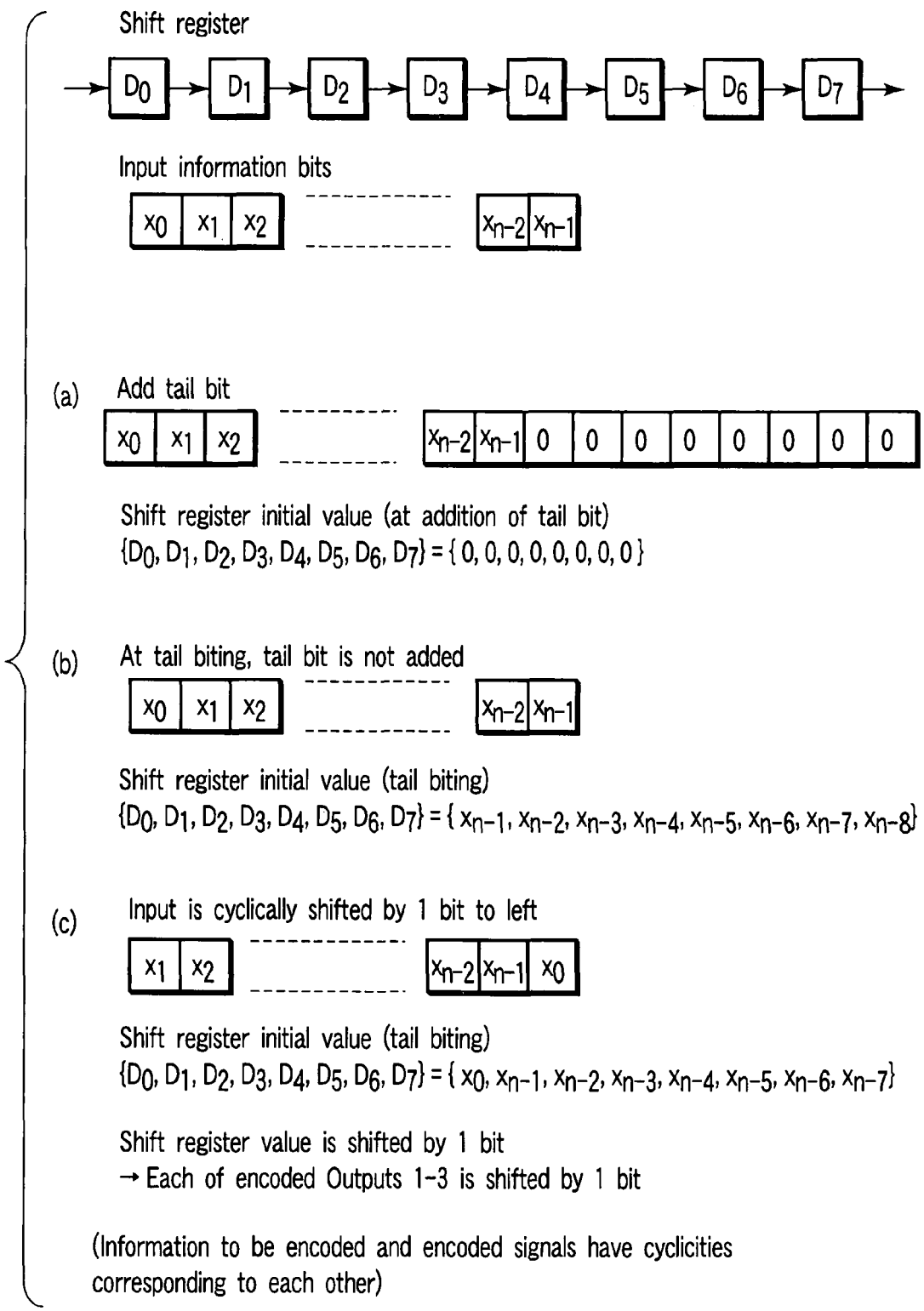
FIG. 2 is an illustration explaining a general convolutional code and a convolutional code based on tail biting.

FIG. 1 shows a configuration of a convolutional encoder having coding rate R=⅓ and a constraint length of 9 (3GPP TS25.212). The encoded information is input to a shift register having a step number of (constraint length—1). In FIG. 1, "D" represents a register. In FIG. 2, (a) general convolutional codes and (b) convolutional codes based on the tail biting are compared. For explanation, an only shift register of FIG. 1 is shown.

First, according to the (a) general convolutional codes, an initial value of shift registers $D_0$-$D_7$ is set at 0, the initial value 0 for register number is added to a last part of an information bit sequence to be encoded as a tail bit, and the shift registers are returned to the initial state after encoding the information. This encoding method is well employed since the initial state and the terminal state of the shift registers are known on the receiving side and decoding can be carried out with a good efficiency. However, if the number of transmission bits is small, overhead caused by adding the tail bit is regarded as a problem.

On the other hand, according to (b) convolutional codes based on the tail biting, convolutional codes having no tail bits can be implemented by adding the last portion of the information bit sequence to be encoded, as the initial value of the shift registers $D_0$-$D_7$. In this case, since the initial state and the terminal state are unknown on the receiving side, a decoding process becomes complicated as compared with (a) convolutional codes having no tail bits. In consideration of the overhead of the tail bits, however, since the transmission power per information bit can be increased, this encoding method is reviewed as an effective method and employment of this encoding method is determined by 3GPP LTE (3GPP TS 36.212v1.2.0).

In addition, in the case of (b) convolutional codes based on the tail biting, if the encoded information bits are bit-shifted, the state of the shift registers is also bit-shifted, and each of Output A, Output B, and Output C of the convolutional encoder shown in FIG. 1 becomes a signal bit-shifted to the same degree. In other words, for example, if the information bits are periodically shifted by 1 bit to the left side as shown in FIG. 2(c), each of Output A, Output B, and Output C of the convolutional encoder shown in FIG. 1 becomes a signal bit-shifted by 1 bit to the left side. Even if the information bits are shifted by 2 or more bits, Output A, Output B, and Output C are considered to be bit-shifted similarly. For this reason, if the signals bit-shifted on the transmitting side are received on the receiving side and subjected to the error-correcting decoding, the information bit-shifted to the same degree can be obtained.

Figure 3:
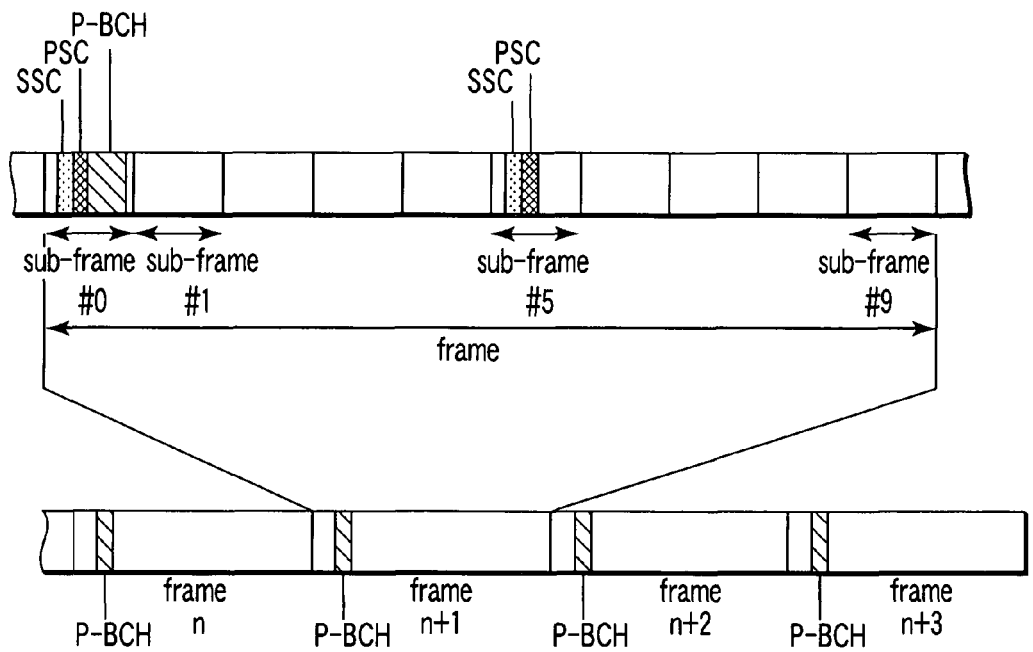
FIG. 3 is an illustration explaining a channel for initial synchronization employed in the digital communications system according to the present invention.

Next, a channel employed for initial synchronization of the downstream line of the cellular system will be described with reference to FIG. 3. At the receiving side of the downstream line, i.e. the mobile station, in the cellular system, sub-frame timings are detected by PSC (primary synchronization channel) transmitted from the base station, and then frame timings are detected by SSC (secondary synchronization channel), as shown in FIG. 3.

The mobile station detects the frame timings and then receives P-BCH.

Figure 4:
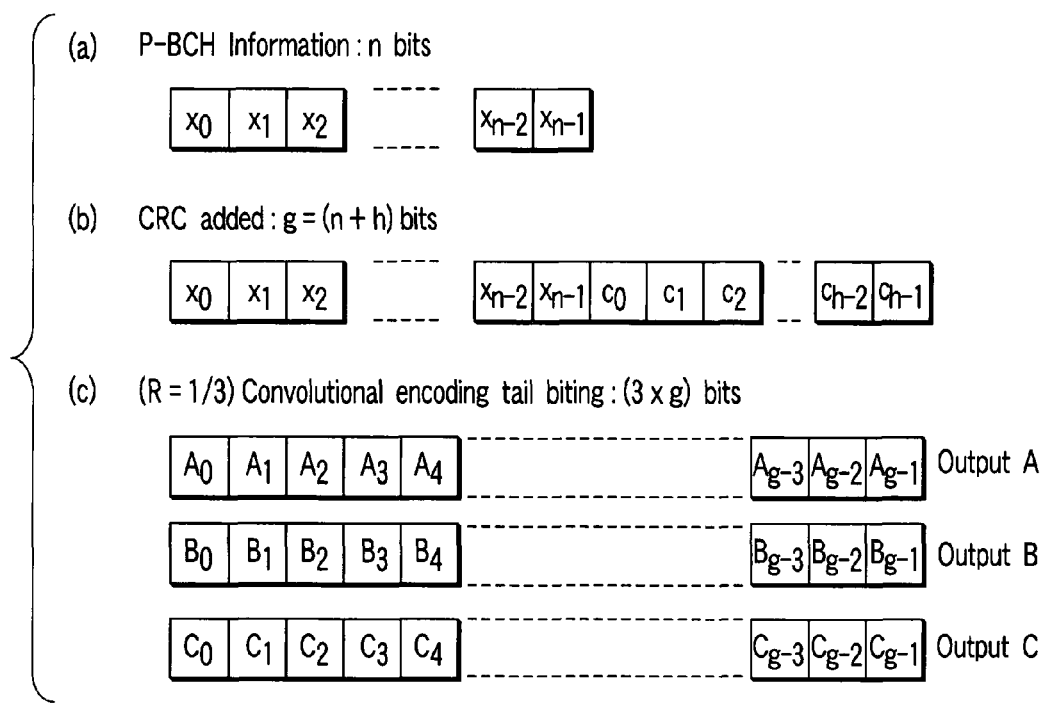
FIG. 4 is an illustration explaining encoding of P-BCH employing the convolutional code based on tail biting.

Encoding P-BCH information will be described with reference to FIG. 4. The P-BCH information of one block is composed of n-bit information. First, h bits of CRC (cyclic redundancy check) bits are added to the information as an error detection code such that the number of bits becomes g (=n+h) bits. Furthermore, convolutional encoding based on the tail biting (R=⅓) is executed as the error-correcting encoding, and g bits are output from each of three Outputs, i.e. totally (3×g) bits are output. The P-BCH information of one block is transmitted by using P-BCH of four frames. At the mobile station, the initial frame of the P-BCH information, of the four frames, needs to be detected. If frame numbers are sequentially assigned to the frames, the initial frame in each of the P-BCH information elements is changed in every four frame numbers.

First Embodiment

Next, a configuration of the base station of the cellular system according to a first embodiment will be described. FIG. 5 mainly shows a configuration of a transmission system of the downstream line provided in the base station. The base station is accommodated in a mobile communications network (not shown) to connect the mobile station and the mobile communications network.

As shown in FIG. 5, the base station comprises a control unit 100, a CRC (cyclic redundancy check) adding unit 101, an error-correcting coding unit 102, a frame division unit 103, a coding rate adjusting unit 104, a modulating unit 105, a sub-carrier assigning unit 106, an IFFT (inverse fast Fourier transform) unit 107, a GI (Guard Interval) adding unit 108, a radio transmission unit 109, and a reception system 110.

The CRC adding unit 101 generates an error detection code for data sequence, with a bit length directed by a control unit 100, and adds the generated error detection code to the data sequence.

The error-correcting coding unit 102 is configured as shown in, for example, FIG. 1 to process a bit string included in transmitted data by error-correcting coding, using a convolutional code based on the tail biting, at the coding rate directed by the control unit 100.

The frame division unit 103 divides the transmitted data subjected to error-correcting coding into frames, under a direction from the control unit 100.

The coding rate adjusting unit 104 adjusts the coding rate by processing an output of the frame division unit 103 by a repetition (bit iteration) process and adjusting the number of bits in the output of the frame division unit 103, on the basis of a parameter directed by the control unit 100.

The modulating unit 105 modulates an output of the coding rate adjusting unit 104 in modulation method M directed by the control unit 100 and generates a data signal represented by a complex value.

The sub-carrier assigning unit 106 generates a signal to be assigned to sub-carriers corresponding, respectively, to the data signal output from the modulating unit 105, and a control signal and a phase reference signal supplied from the control unit 100, under a direction from the control unit 100.

The IFFT unit 107 generates an OFDM signal as a sequence of a plurality of OFDM symbols by processing the signal output from the sub-carrier assigning unit 106 by OFDM modulation. In other words, the IFFT unit 107 generates an OFDM signal by converting a signal of a frequency domain into a signal of a time domain.

The GI adding unit 108 adds guard interval to the OFDM signal output from the IFFT unit 107 and then outputs the OFDM signal.

The radio transmission unit 109 comprises a DA converter configured to process the output of the GI adding unit 108 by digital-to-analog conversion, an up-converter configured to up-convert an output of the D/A converter, and a power amplifier configured to amplify an output of the up-converter. The radio transmission unit 109 generates a radio (RF) signal by these units and transmits the RF signal from an antenna.

The reception system 110 receives the RF signal transmitted from the mobile station and detects quality of the signal received from the mobile station.

The control unit 100 controls all the units of the base station to generate a transmission signal and transmit the transmission signal to the mobile station. In addition, the control unit 100 stores a transmission format table. The control unit 100 selects the transmission format which should be used for the transmission to the mobile station, on the basis of control information (CQI) received from the mobile station by the reception system 110 and the signal quality detected by the reception system 110. Then, the control unit 100 includes MCS information representing the selected transmission format in the control information and transmits the control information to the mobile station.

When the control unit 100 determines the transmission format, the control unit 100 transmits the MCS information representing the determined transmission format to the mobile station. After that, the control unit 100 controls all the units of the mobile station such that the data signal can be transmitted in the determined transmission format.

Next, a configuration of the mobile station of the cellular system according to the first embodiment will be described. FIG. 6 mainly shows a configuration of a reception system of the downstream line provided in the mobile station. The mobile station establishes communications with a communication partner via the base station and the mobile communications network.

As shown in FIG. 6, the mobile station comprises a control unit 200, a radio reception unit 201, a GI (Guard Interval) removing unit 202, an FFT (fast Fourier transform) unit 203, a signal separating unit 204, a demodulating unit 205, a coding rate adjusting unit 206, a frame synthesizing unit 207, an error-correcting decoding unit 208, a CRC (cyclic redundancy check) error detecting unit 209, a frame timing blind detecting unit 210, and a transmission system 211.

The radio reception unit 201 comprises a band-pass filter configured to receive the RF signal transmitted from the base station and remove noise in a band outside a desired band, and an AD converter configured to convert a signal passing through the filter into a baseband digital signal.

The GI removing unit 202 removes guard interval from the baseband digital signal output from the radio reception unit 201.

The FFT unit 203 processes the digital signal fro which the guard interval is removed by the GI removing unit 202, by fast Fourier transform, and converts a signal of the time domain into a signal of the frequency domain to divide the signal into signals for the respective sub-carriers.

The signal separating unit 204 separates the signals divided for the respective sub-carriers to the control signal, the phase reference signal, the data signal and the like, and outputs the separated signals to modules corresponding to the respective separated signals.

The demodulating unit 205 obtains a channel estimate value of a sub-carrier frequency from the phase reference signal, processes the signals output from the signal separating unit 204 by channel equivalence using the channel estimate value, demodulates a result of equivalence in a demodulation method directed by the control unit 200, and thereby regenerates the bit string included in the data signal.

The coding rate adjusting unit 206 accumulates signals repeatedly input from the demodulating unit 205 and outputs them as a single data element, on the basis of a parameter directed by the control unit 200.

The frame synthesizing unit 207 synthesizes the received signals of the respective frames to a single received data element, under a direction of the control unit 200.

The error-correcting decoding unit 208 processes the received data synthesized by the frame synthesizing unit 207, by error-correcting decoding, at a coding rate directed by the control unit 200.

The CRC error detecting unit 209 processes the received data decoded by the error-correcting decoding unit 208, by error detection, on the basis of a bit length directed by the control unit 200.

The frame timing blind detecting unit 210 processes the received by cyclic shifting under a direction of the control unit 200, monitors a result of CRC error detection, and detects an initial timing (timing of the leading frame) of the transmission from a shift amount received without errors.

The control unit 200 generates control information including CQI representing an interference level which a quality measuring unit (not shown) obtains from the received signal transmitted from the base station, and transmits the control information to the base station via the transmission system 211. The control unit 200 prestores a transmission format table. In the transmission format table, the MCS information to identify the transmission format corresponds to information such as modulation method M, coding rate R, parameter N to determine the number of repetitions and orthogonalization, and the like.

Then, the control unit 200 detects the MCS information from the control information extracted by the demodulating unit 205, and recognizes that the transmission format which the base station is to use for the transmission to the mobile station is the transmission format represented by the MCS information. The control unit 200 controls all the units of the mobile station by using the parameter corresponding to the MCS information to receive the information transmitted from the base station by referring to the transmission format table. The control unit 200 thereby receives the signal transmitted from the base station in the transmission format.

Next, operations of the digital communications system having the above-explained configuration will be described.

Figure 7:
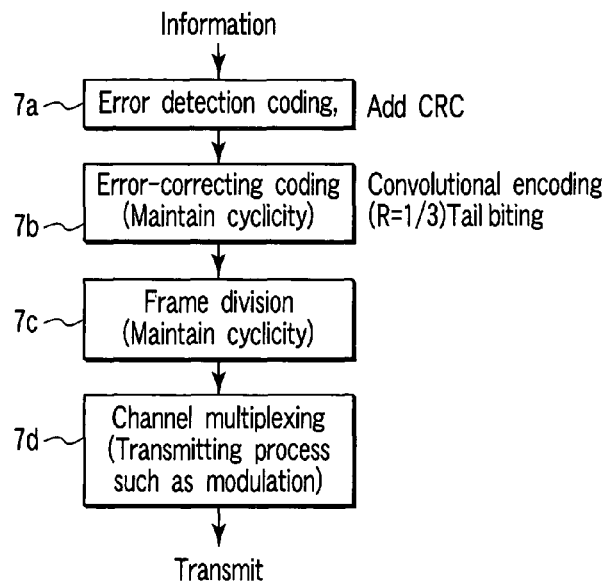
FIG. 7 is a flowchart showing a flow of a process relating to information transmission at the base station shown in FIG. 5.
Figure 8:
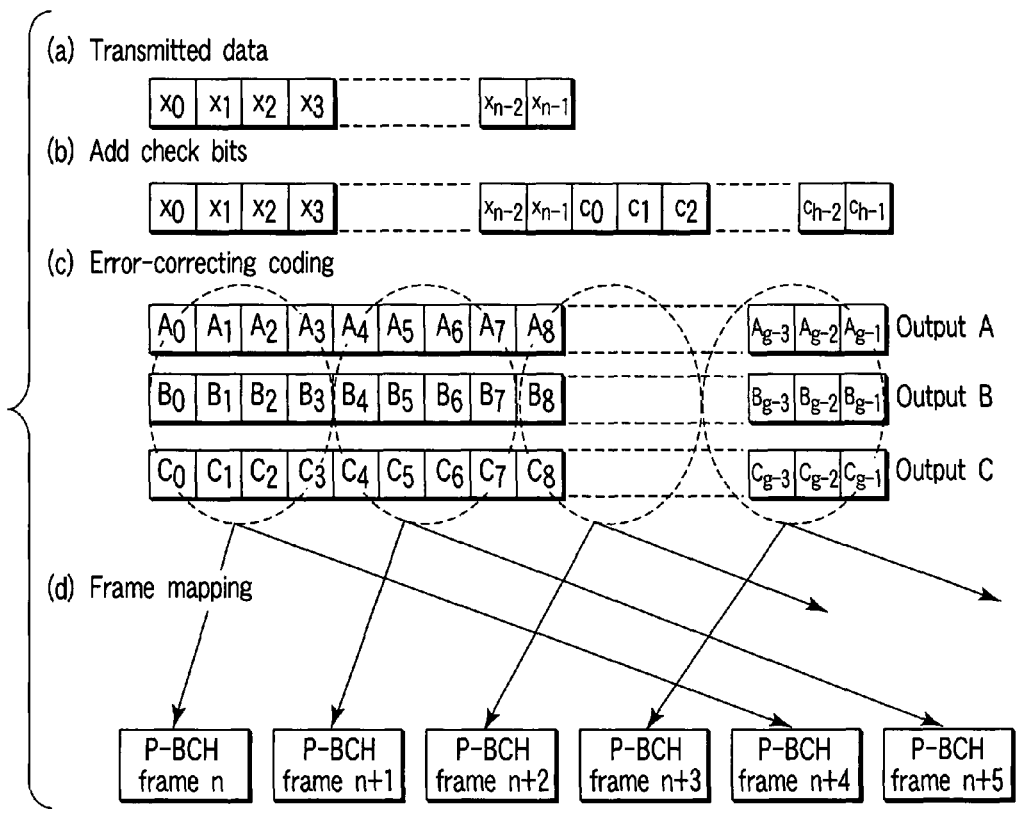
FIG. 8 is an illustration explaining transition of transmitted data in the flow shown in FIG. 7.

First, the transmitting operation of the base station will be described. FIG. 7 shows a flow of the main transmission process at the base station. This process is executed by controlling all the units of the base station by the control unit 100. FIG. 8 shows a transition of transmitted data corresponding to the flow.

In step 7a, the control unit 100 controls the CRC adding unit 101 such that the CRC adding unit 101 adds check bits $c_0$-$c_{h-1}$ for error correction to transmitted data $X_0$-$X_{n-1}$ shown in FIG. 8(a), as shown in FIG. 8(b). The control unit 100 proceeds to step 7b.

In step 7b, the control unit 100 controls the error-correcting encoding unit 102 such that the error-correcting encoding unit 102 processes the transmitted data $X_0$-$X_{n-1}$ to which the check bits $c_0$-$c_{h-1}$ for error correction are added as shown in FIG. 8(b), by error-correcting coding (convolutional coding), and thereby obtains three outputs, i.e. Output A, Output B, and Output C as shown in FIG. 8(c). As described in FIG. 2, the information to be encoded (transmitted data $X_0$-$X_{n-1}$ to which the check bits $c_0$-$c_{h-1}$ are added) corresponds in periodicity to the three outputs Output A, Output B, and Output C by the tail biting.

In step 7c, the control unit 100 controls the frame division unit 103 such that the frame division unit 103 maps the Output A, Output B, and Output C on a plurality of frames as shown in FIG. 8(d). The control unit 100 thereby generates four elements of P-BCH as shown in FIG. 8(d). In this case, the Output A, Output B, and Output C are divided into four frames. At this time, too, the information to be encoded (transmitted data $X_0$-$X_{n-1}$ to which the check bits $c_0$-$c_{h-1}$ are added) and the P-BCH correspond in periodicity.

In step 7d, the control unit 100 controls the coding rate adjusting unit 104, the modulating unit 105 and the sub-carrier assigning unit 106 to process the P-BCH by channel multiplexing and modulation. The transmission signal thereby obtained is transmitted to the mobile station via the IFFT unit 107, the GI adding unit 108, and the radio transmission unit 109.

Figure 9:
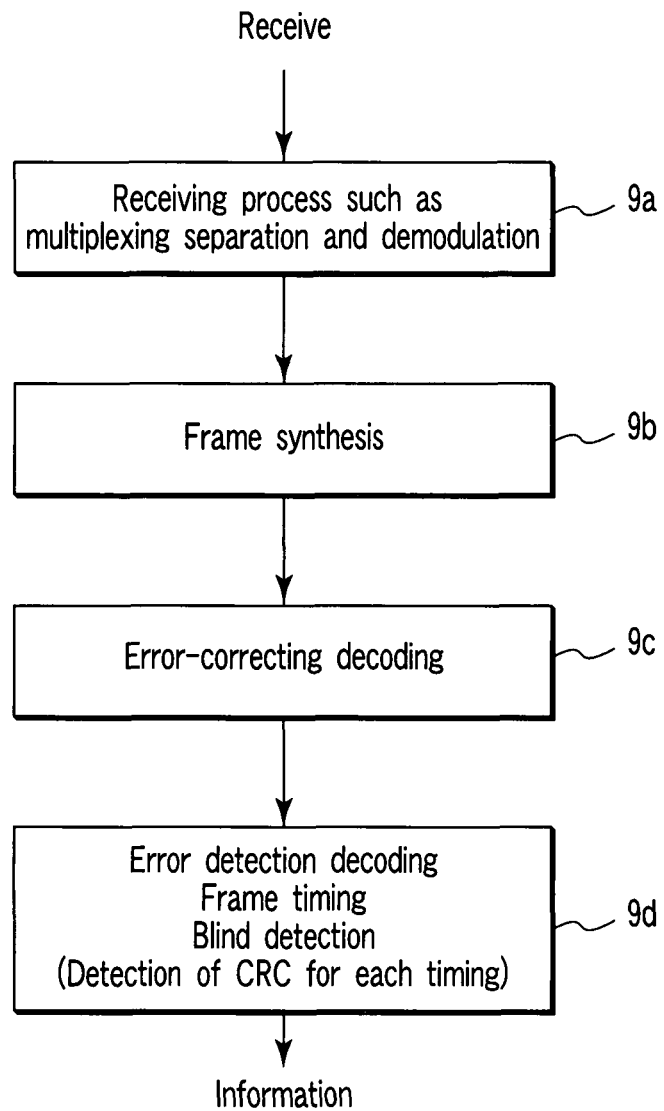
FIG. 9 is a flowchart showing a flow of a process relating to information reception at the mobile station shown in FIG. 6.
Figure 10:
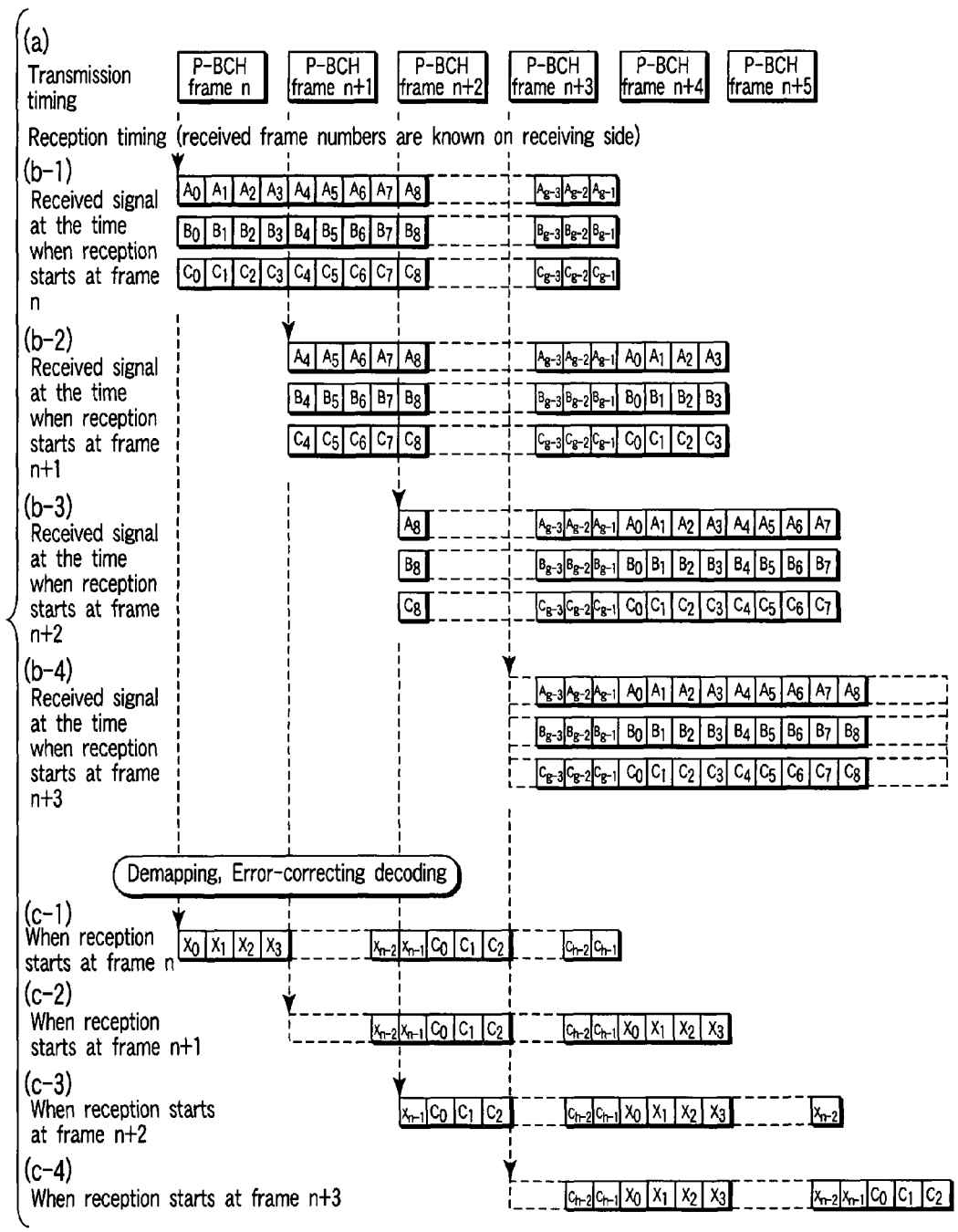
FIG. 10 is an illustration explaining a transition of received data in the flow shown in FIG. 9.

On the other hand, the mobile station executes the following receiving operations. FIG. 9 shows a flow of the main receiving process at the mobile station. This process is executed by controlling all the units of the mobile station by the control unit 200. FIG. 10 shows a transition of received data corresponding to the flow. Detection of the frame timing is executed by the control unit 200, on the basis of the PSC and the SSC of the signals separated by the signal separating unit 204, as already described with reference to FIG. 3.

In step 9a, the control unit 200 controls the signal separating unit 204 such that the signal separating unit 204 separates the P-BCH from the multiplexed received data obtained via the radio reception unit 201, the GI removing unit 202 and the FFT unit 203 as shown in FIG. 10(a). The separated P-BCH are demodulated by the demodulating unit 205 controlled by the control unit 200. After that, the coding rate of the demodulation result of the demodulating unit 205 is adjusted by the coding rate adjusting unit 206 controlled by the control unit 200, and four P-BCH divided for frames are thereby obtained.

In step 9b, the control unit 200 controls the frame synthesizing unit 207 such that the frame synthesizing unit 207 synthesizes the frames of the output of the coding rate adjusting unit 206. In other words, the frame synthesizing unit 207 synthesizes four frames of P-BCH. Since the frame numbers are unknown on the mobile station side, the demodulation result for four frames is synthesized at an arbitrary timing. Thus, four kinds of reception signals may be obtained according to the timings of frame synthesis as shown in FIG. 10 (b-1) to (b-4). Actually, one of the reception signals is obtained.

In step 9c, the control unit 200 controls the error-correcting decoding unit 208 such that the error-correcting decoding unit 208 executes decoding corresponding to the encoding at the error-correcting encoding unit 102, and the control unit 200 obtains the received data. As shown in FIG. 10, received data represented by (c-1) to (c-4) are obtained from four signals (b-1) to (b-4) corresponding to start timings of the frame synthesis.

In step 9d, the control unit 200 controls the CRC error detecting unit 209 such that the CRC error detecting unit 209 sequentially executes CRC detection at four frame timings respectively. The frame timing blind detecting unit 210 detects the timing of the leading frame of the received data composed of four P-BCH, from the detection result.

Figure 11:
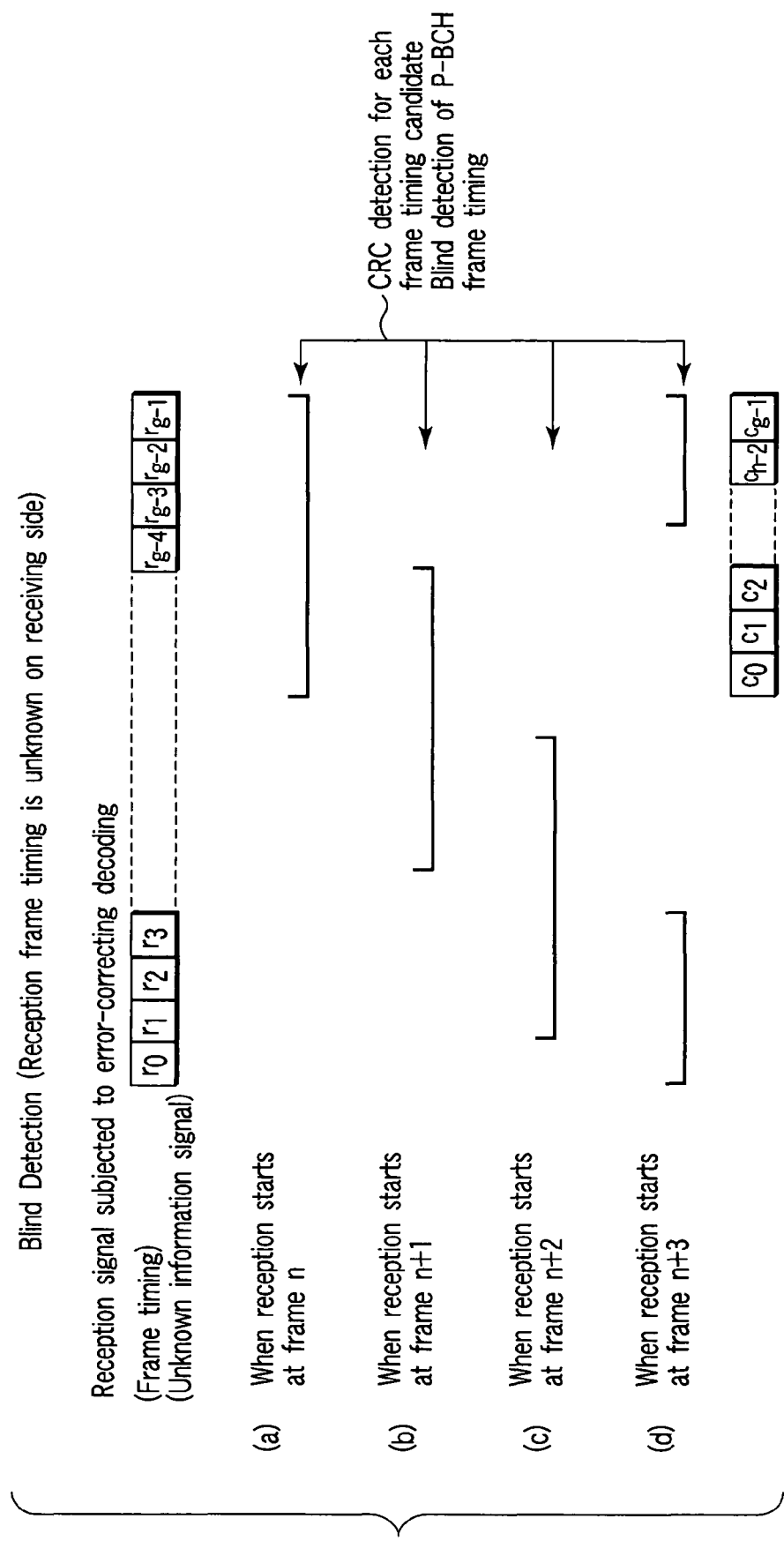
FIG. 11 is an illustration explaining an operation of detecting a leading frame in the flow shown in FIG. 9.

In other words, the frame numbers are unknown on the mobile station side, but four frame timings are detected by the control unit 200 on the basis of the PSC and the SSC. Thus, the CRC error detecting unit 209 executes CRC detection at bit positions corresponding respectively to the four frame timings notified by the control unit 200, as shown in FIG. 11. On the basis of four CRC detection results, the frame timing blind detecting unit 210 detects the frame timing at which normal data are obtained, cuts the check bits from the received data obtained by the error-correcting decoding unit 208 on the basis of the frame timing, realigns the transmitted data in a determined sequence if necessary, and obtains the data to be transmitted.

In the digital communications system having the above-described configuration, after the CRC is added to the transmitted data as the error detection code, the transmitted data is subjected to error-correcting coding using the convolutional code based on the tail biting, and the transmitted data is divided into four P-BCH and transmitted, at the base station. For this reason, at the mobile station, even if reception (synthesis) is started at any frame of the P-BCH, the periodical structure of the transmission signal can be maintained by the tail biting, and the received data shifted by unit of frame can be obtained. Therefore, at the mobile station, even if the leading frame is unknown, decoding can be executed by executing the error-correcting decoding at one time. The decoding result is subjected to CRC detection at four frame timings, the leading frame is detected and the transmitted data is restored.

Therefore, even if there are a plurality of candidates for the start position of the transmission format, decoding can be executed by executing the error-correcting decoding at one time, and the start position of the transmission format can be thereby detected without processing a great amount of data.

Second Embodiment

Next, a configuration of the base station of the cellular system according to a second embodiment will be described. FIG. 12 mainly shows a configuration of a transmission system of the downstream line provided in the base station. The base station is accommodated in a mobile communications network (not shown) to connect the mobile station and the mobile communications network.

As shown in FIG. 12, the base station comprises a control unit 300, a CRC (cyclic redundancy check) adding unit 301, an error-correcting coding unit 302, a frame division unit 303, a coding rate adjusting unit 304, a modulating unit 305, a sub-carrier assigning unit 306, an IFFT (inverse fast Fourier transform) unit 307, a GI (Guard Interval) adding unit 308, a radio transmission unit 309, a reception system 310, a channel interleaver 311 and an in-frame interleaver 312.

The CRC adding unit 301 generates an error detection code for data sequence, with a bit length directed by a control unit 300, and adds the generated error detection code to the data sequence.

The error-correcting coding unit 302 is configured as shown in, for example, FIG. 1 to process a bit string included in transmitted data by error-correcting coding using a convolutional code based on the tail biting, at the coding rate directed by the control unit 300.

The channel interleaver 311 interleaves all transmitted data subjected to error-correcting coding while maintaining the cyclicity thereof, on the basis of an interleaving pattern directed by the control unit 300.

The frame division unit 303 divides the interleaved transmitted data into frames, under a direction from the control unit 300.

The coding rate adjusting unit 304 adjusts the coding rate by executing a repetition (bit repetition) process for the transmitted data in each of the frames and adjusting the number of bits of the transmitted data in each of the frames, on the basis of a parameter directed by the control unit 300.

The in-frame interleaver 312 interleaves the transmitted data in each of the frames output from the coding rate adjusting unit 304, on the basis of the interleaving pattern directed by the control unit 300.

The modulating unit 305 modulates an output of the in-frame interleaver 312 in modulation method M directed by the control unit 300 and generates a data signal represented by a complex value.

The sub-carrier assigning unit 306 generates a signal to be assigned to sub-carriers corresponding, respectively, to the data signal output from the modulating unit 305, and a control signal and a phase reference signal supplied from the control unit 300, under a direction from the control unit 300.

The IFFT unit 307 generates an OFDM signal as a sequence of a plurality of OFDM symbols by processing the signal output from the sub-carrier assigning unit 306 by OFDM modulation. In other words, the IFFT unit 307 generates an OFDM signal by converting a signal of a frequency domain into a signal of a time domain.

The GI adding unit 308 adds guard interval to the OFDM signal output from the IFFT unit 307 and then outputs the OFDM signal.

The radio transmission unit 309 comprises a DA converter configured to process the output of the GI adding unit 308 by digital-to-analog conversion, an up-converter configured to up-convert an output of the D/A converter, and a power amplifier configured to amplify an output of the up-converter. The radio transmission unit 309 generates a radio (RF) signal by these units and transmits the RF signal from an antenna.

The reception system 310 receives the RF signal transmitted from the mobile station and detects quality of the signal received from the mobile station.

The control unit 300 controls all the units of the base station to generate a transmission signal and transmit the transmission signal to the mobile station. In addition, the control unit 300 stores a transmission format table. The control unit 300 selects the transmission format which should be used for the transmission to the mobile station, on the basis of control information (CQI) received from the mobile station by the reception system 310 and the signal quality detected by the reception system 310. Then, the control unit 300 includes MCS information representing the selected transmission format in the control information and transmits the control information to the mobile station.

When the control unit 300 determines the transmission format, the control unit 300 transmits the MCS information representing the determined transmission format to the mobile station. After that, the control unit 300 controls all the units of the mobile station such that the data signal can be transmitted in the determined transmission format.

Next, a configuration of the mobile station of the cellular system according to the second embodiment will be described. FIG. 13 mainly shows a configuration of a reception system of the downstream line provided in the mobile station. The mobile station establishes communications with a communication partner via the base station and the mobile communications network.

As shown in FIG. 13, the mobile station comprises a control unit 400, a radio reception unit 401, a GI (Guard Interval) removing unit 402, an FFT (fast Fourier transform) unit 403, a signal separating unit 404, a demodulating unit 405, a coding rate adjusting unit 406, a frame synthesizing unit 407, an error-correcting decoding unit 408, a CRC (cyclic redundancy check) error detecting unit 409, a frame timing blind detecting unit 410, a transmission system 411, an in-frame deinterleaver 412 and a channel deinterleaver 413.

The radio reception unit 401 comprises a band-pass filter configured to receive the RF signal transmitted from the base station and remove noise in a band outside a desired band, and an AD converter configured to convert a signal passing through the filter into a baseband digital signal.

The GI removing unit 402 removes guard interval from the baseband digital signal output from the radio reception unit 401.

The FFT unit 403 processes the digital signal fro which the guard interval is removed by the GI removing unit 402, by fast Fourier transform, and converts a signal of the time domain into a signal of the frequency domain to divide the signal into signals for the respective sub-carriers.

The signal separating unit 404 separates the signals divided for the respective sub-carriers to the control signal, the phase reference signal, the data signal and the like, and outputs the separated signals to modules corresponding to the respective separated signals.

The demodulating unit 405 obtains a channel estimate value of a sub-carrier frequency from the phase reference signal, processes the signals output from the signal separating unit 404 by channel equivalence using the channel estimate value, demodulates a result of equivalence in a demodulation method directed by the control unit 400, and thereby regenerates the bit string included in the data signal.

The in-frame deinterleaver 412 corresponds to the in-frame interleaver 312 of the base station, and deinterleaves the data signal obtained by the demodulating unit 405, for each of the frames, on the basis of the interleaving pattern directed by the control unit 400.

The coding rate adjusting unit 406 accumulates signals repeatedly input from the in-frame deinterleaver 412 and outputs them as a single data element, on the basis of a parameter directed by the control unit 400.

The frame synthesizing unit 407 synthesizes the received signals of the respective frames output from the coding rate adjusting unit 406, under a direction of the control unit 400.

The channel deinterleaver 413 corresponds to the channel interleaver 311 of the mobile station, and deinterleavers the received data synthesized by the frame synthesizing unit 407, on the basis of the interleaving pattern directed by the control unit 400.

The error-correcting decoding unit 408 processes the received data deinterleaved by the channel deinterleaver 413, by error-correcting decoding, at a coding rate directed by the control unit 400.

The CRC error detecting unit 409 processes the received data decoded by the error-correcting decoding unit 408, by error detection, on the basis of a bit length directed by the control unit 400.

The frame timing blind detecting unit 410 processes the received by cyclic shifting under a direction of the control unit 400, monitors a result of CRC error detection, and detects an initial timing (timing of the leading frame) of the transmission from a shift amount received without errors.

The control unit 400 generates control information including CQI representing an interference level which a quality measuring unit (not shown) obtains from the received signal transmitted from the base station, and transmits the control information to the base station via the transmission system 411. The control unit 400 prestores a transmission format table. In the transmission format table, the MCS information to identify the transmission format corresponds to information such as modulation method M, coding rate R, parameter N to determine the number of repetitions and orthogonalization, and the like.

Then, the control unit 400 detects the MCS information from the control information extracted by the demodulating unit 405, and recognizes that the transmission format which the base station is to use for the transmission to the mobile station is the transmission format represented by the MCS information. The control unit 400 controls all the units of the mobile station by using the parameter corresponding to the MCS information to receive the information transmitted from the base station by referring to the transmission format table. The control unit 400 thereby receives the signal transmitted from the base station in the transmission format.

Next, operations of the digital communications system having the above-explained configuration will be described.

Figure 15:
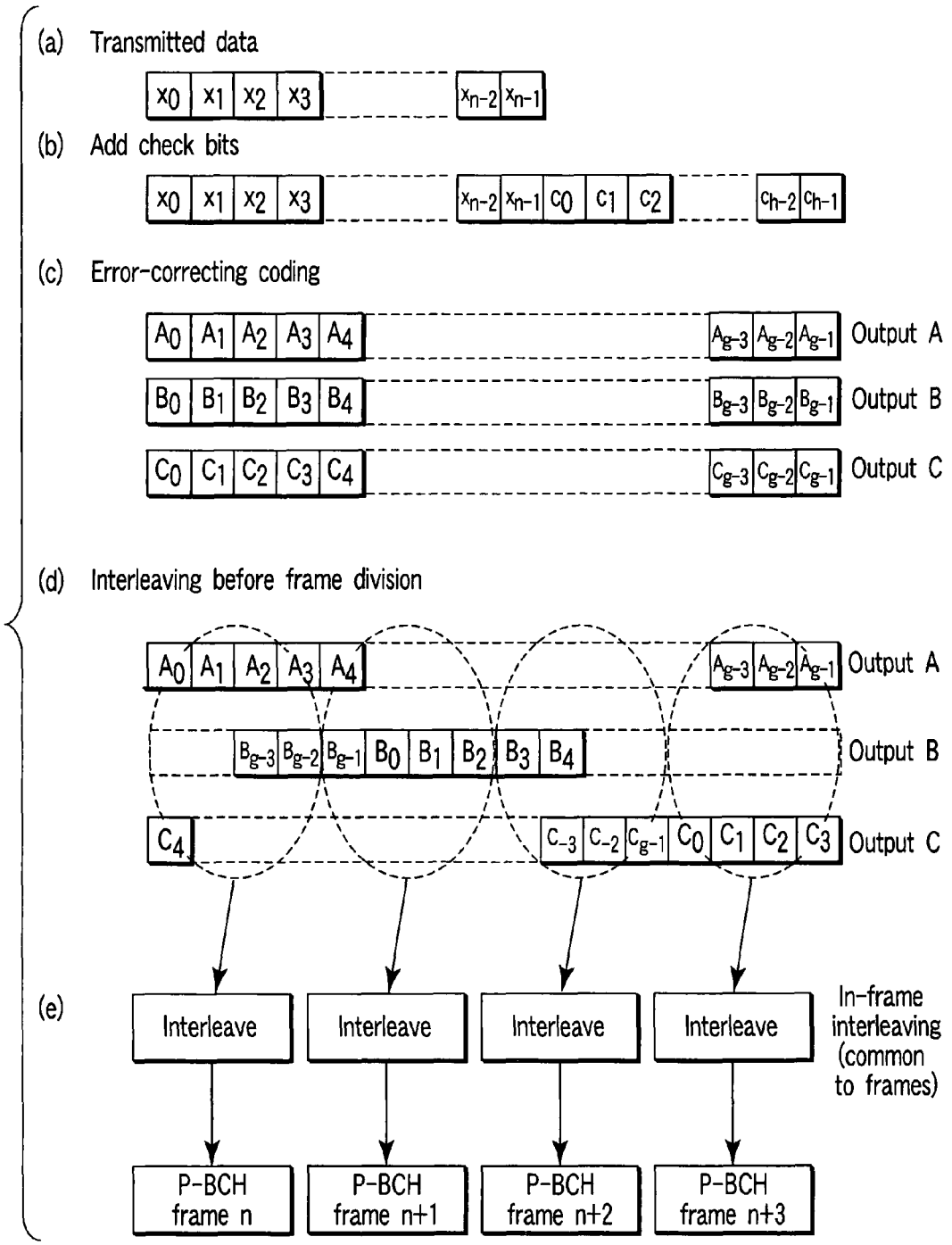
FIG. 15 is an illustration explaining transition of transmitted data in the flow shown in FIG. 14.

First, the transmitting operation of the base station will be described. FIG. 14 shows a flow of the main transmission process at the base station. This process is executed by controlling all the units of the base station by the control unit 300. FIG. 15 shows a transition of transmitted data corresponding to the flow.

In step 14$a$, the control unit 300 controls the CRC adding unit 301 such that the CRC adding unit 301 adds check bits $c_0$-$c_{h-1}$ for error correction to transmitted data $X_0$-$X_{n-1}$ shown in FIG. 15($a$), as shown in FIG. 15($b$). The control unit 300 proceeds to step 14$b$.

In step 14$b$, the control unit 300 controls the error-correcting encoding unit 302 such that the error-correcting encoding unit 302 processes the transmitted data $X_9$-$X_{n-1}$ to which the check bits $c_0$-$c_{h-1}$ for error correction are added as shown in FIG. 15($b$), by error-correcting coding (convolutional coding), and thereby obtains three outputs, i.e. Output A, Output B, and Output C as shown in FIG. 15($c$). As described in FIG. 2, the information to be encoded (transmitted data $X_0$-$X_{n-1}$ to which the check bits $c_0$-$c_{h-1}$ are added) corresponds in cyclicity to the three outputs Output A, Output B, and Output C by the tail biting.

In step 14$c$, the control unit 300 controls the channel interleaver 311 such that the channel interleaver 311 interleaves the Output A, Output B and Output C as shown in FIG. 15($d$) on the basis of an interleaving pattern directed by the control unit 300.

In step 14$d$, the control unit 300 controls the frame division unit 303 such that the frame division unit 303 maps the interleaved Output A', Output B' and Output C' on a plurality of frames. The control unit 300 thereby divides the outputs into frames as shown in FIG. 15($d$). An example of dividing the interleaved Output A', Output B' and Output C' into four frames is described here. In this case, too, the information to be encoded (transmitted data $X_0$-$X_{n-1}$ to which the check bits $c_0$-$c_{h-1}$ are added) and the Output A', Output B' and Output C' divided into four frames correspond in cyclicity.

In step 14$e$, the control unit 300 controls the in-frame interleaver 312 such that the in-frame interleaver 312 interleaves each of the Output A', Output B' and Output C' divided into four frames on the basis of the interleaving pattern directed by the control unit 300 and thereby generates four P-BCH as shown in FIG. 15($e$). The interleaving pattern applied to each of the frames is common.

In step 14$f$, the control unit 300 controls the coding rate adjusting unit 304, the modulating unit 305 and the sub-carrier assigning unit 306 to process the P-BCH by channel multiplexing and modulation. The transmission signal thereby obtained is transmitted to the mobile station via the IFFT unit 307, the GI adding unit 308, and the radio transmission unit 309.

Figure 17:
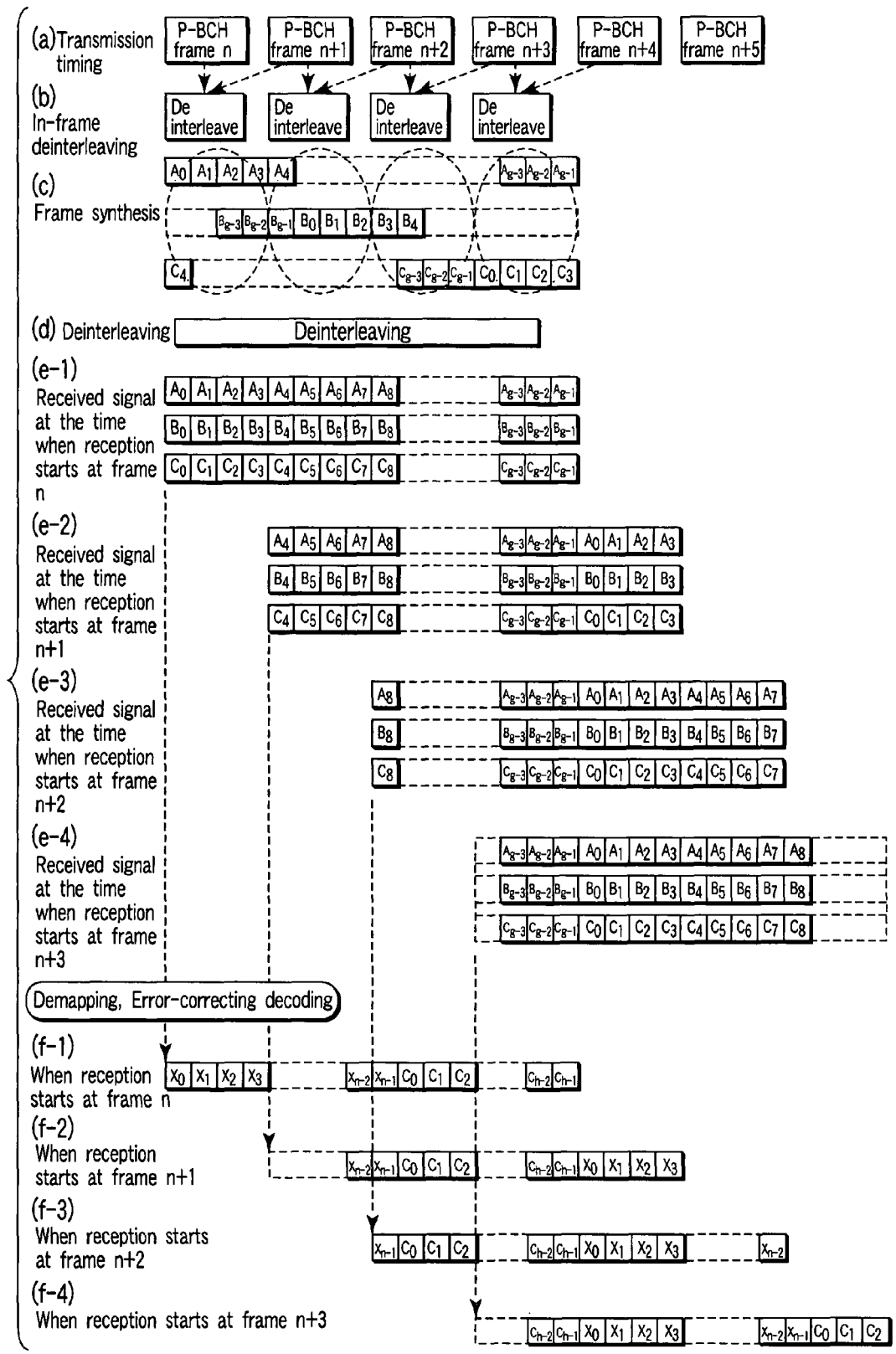
FIG. 17 is an illustration explaining a transition of received data in the flow shown in FIG. 16.

On the other hand, the mobile station executes the following receiving operations. FIG. 16 shows a flow of the main receiving process at the mobile station. This process is executed by controlling all the units of the mobile station by the control unit 400. FIG. 17 shows a transition of received data corresponding to the flow. Detection of the frame timing is executed by the control unit 400, on the basis of the PSC and the SSC of the signals separated by the signal separating unit 404, as already described with reference to FIG. 3.

In step 16*a*, the control unit 400 controls the signal separating unit 404 such that the signal separating unit 404 separates the P-BCH from the multiplexed received data obtained via the radio reception unit 401, the GI removing unit 402 and the FFT unit 403 as shown in FIG. 17(*a*). The separated P-BCH are demodulated by the demodulating unit 405 controlled by the control unit 400. Thus, four P-BCH divided for frames are thereby obtained.

In step 16*b*, the control unit 400 controls the in-frame deinterleaver 412 such that the in-frame deinterleaver 412 deinterleaves the P-BCH of the respective frames in a common deinterleaving pattern directed by the control unit 400, as shown in FIG. 17(*b*).

In step 16*c*, the control unit 400 controls the coding rate adjusting unit 406 such that the coding rate adjusting unit 406 adjusts the coding rate of the deinterleaved data. Then, the control unit 400 controls the frame synthesizing unit 407 such that the frame synthesizing unit 407 synthesizes the frames of the output of the coding rate adjusting unit 406. In other words, the frame synthesizing unit 407 synthesizes four frames of the deinterleaved P-BCH as shown in FIG. 17(*c*).

In step 16*d*, the control unit 400 controls the channel deinterleaver 413 such that the channel deinterleaver 413 deinterleaves the signals of frame synthesis as shown in FIG. 17(*d*). Since the frame numbers are unknown on the mobile station side, the demodulation result for four frames is synthesized at an arbitrary timing. Thus, four kinds of reception signals may be obtained according to the timings of frame synthesis as shown in FIG. 17 (*e*-1) to (*e*-4). Actually, one of the reception signals is obtained.

In step 16*e*, the control unit 400 controls the error-correcting decoding unit 408 such that the error-correcting decoding unit 408 executes decoding corresponding to the encoding at the error-correcting encoding unit 302, and the control unit 400 obtains the received data. As shown in FIG. 17, received data represented by (f-1) to (f-4) are obtained from four signals (e-1) to (e-4) corresponding to start timings of the frame synthesis.

In step 16*f*, the control unit 400 controls the CRC error detecting unit 409 such that the CRC error detecting unit 409 sequentially executes CRC detection at four frame timings respectively. The frame timing blind detecting unit 410 detects the timing of the leading frame of the received data composed of four P-BCH, from the detection result.

Figure 18:
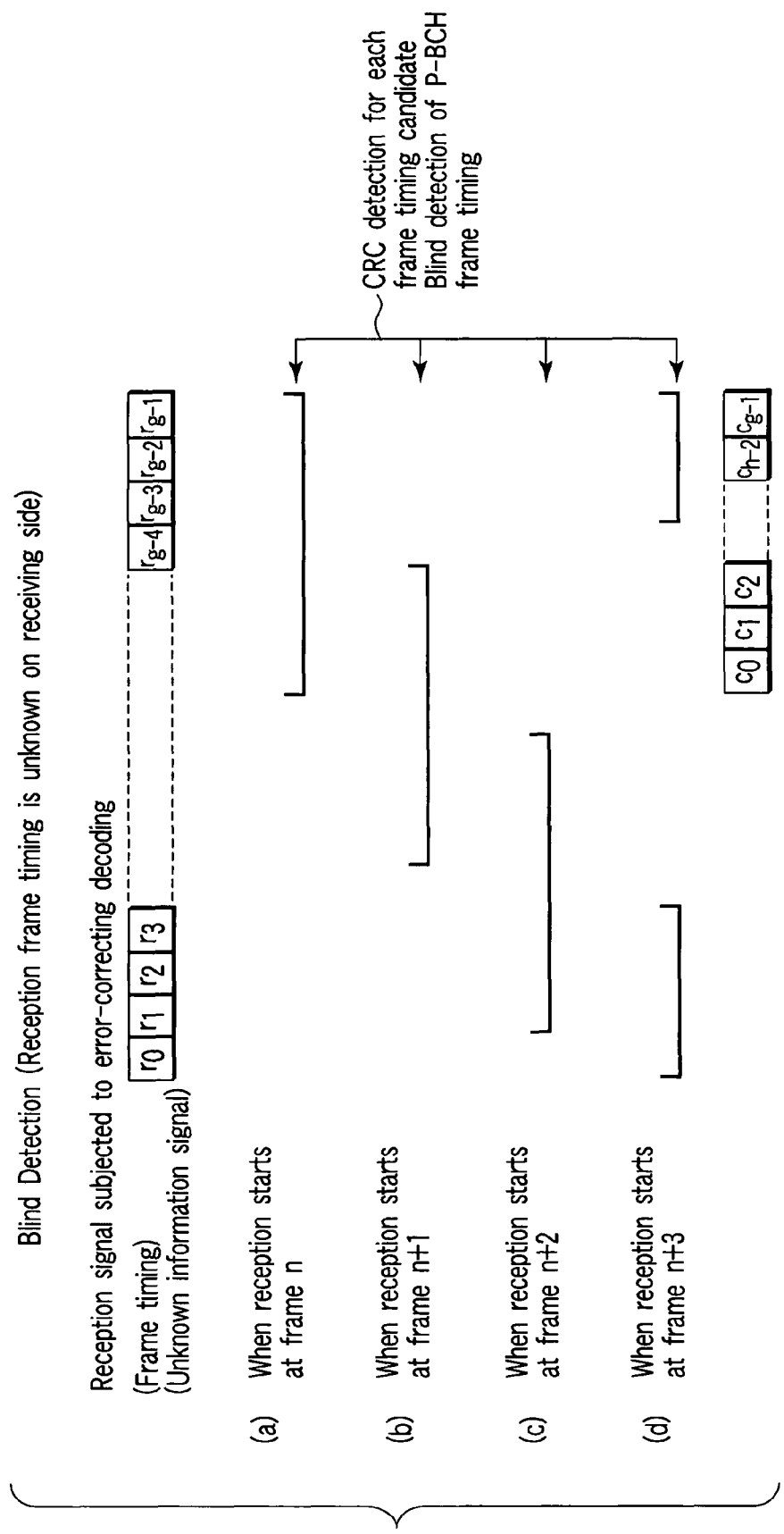
FIG. 18 is an illustration explaining an operation of detecting a leading frame in the flow shown in FIG. 16.

In other words, the frame numbers are unknown on the mobile station side, but four frame timings are detected by the control unit 400 on the basis of the PSC and the SSC. Thus, the CRC error detecting unit 409 executes CRC detection at bit positions corresponding respectively to the four frame timings notified by the control unit 400, as shown in FIG. 18. On the basis of four CRC detection results, the frame timing blind detecting unit 410 detects the frame timing at which normal data are obtained, cuts the check bits from the received data obtained by the error-correcting decoding unit 408 on the basis of the frame timing, realigns the transmitted data in a determined sequence if necessary, and obtains the data to be transmitted.

In the digital communications system having the above-described configuration, after the CRC is added to the transmitted data as the error detection code, the transmitted data is subjected to error-correcting coding using the convolutional code based on the tail biting, and the transmitted data is divided into four P-BCH and transmitted, at the base station. For this reason, at the mobile station, even if reception (synthesis) is started at any frame of the P-BCH, the cyclical structure of the transmission signal can be maintained by the tail biting, and the received data shifted by unit of frame can be obtained. Therefore, at the mobile station, even if the leading frame is unknown, decoding can be executed by executing the error-correcting decoding at one time. The decoding result is subjected to CRC detection at four frame timings, the leading frame is detected and the transmitted data is restored.

Therefore, even if there are a plurality of candidates for the start position of the transmission format, decoding can be executed by executing the error-correcting decoding at one time, and the start position of the transmission format can be thereby detected without processing a great amount of data.

In addition, in the second embodiment, the feature of interleaving is added to the digital communications system of the first embodiment. Since interleaving executed for every frame uses the common interleaving pattern, deinterleaving can be executed even if the frame numbers are unknown.

Third Embodiment

Figure 19:
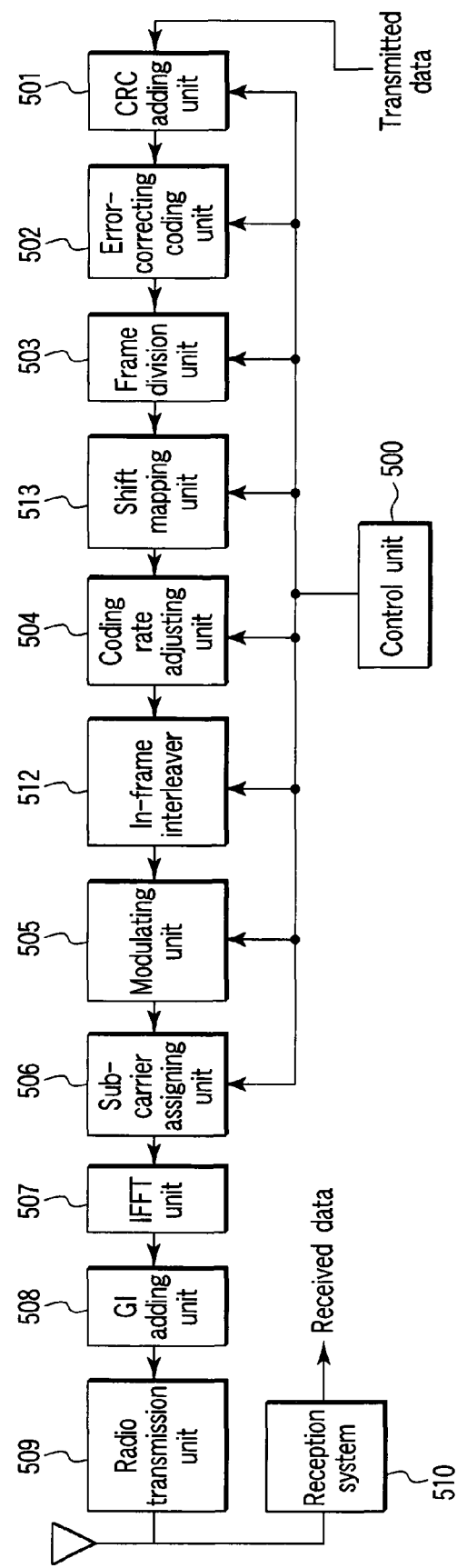
FIG. 19 is a block diagram showing a configuration of a base station of the digital communications system according to a third embodiment of the present invention.

Next, a configuration of the base station of the cellular system according to a third embodiment will be described. FIG. 19 mainly shows a configuration of a transmission system of the downstream line provided in the base station. The base station is accommodated in a mobile communications network (not shown) to connect the mobile station and the mobile communications network.

As shown in FIG. 19, the base station comprises a control unit 500, a CRC (cyclic redundancy check) adding unit 501, an error-correcting coding unit 502, a frame division unit 503, a coding rate adjusting unit 504, a modulating unit 505, a sub-carrier assigning unit 506, an IFFT (inverse fast Fourier transform) unit 507, a GI (Guard Interval) adding unit 508, a radio transmission unit 509, a reception system 510, an in-frame interleaver 512 and a shift mapping unit 513.

The CRC adding unit 501 generates an error detection code for data sequence, with a bit length directed by a control unit 500, and adds the generated error detection code to the data sequence.

The error-correcting coding unit 502 is configured as shown in, for example, FIG. 1 to process a bit string included in transmitted data by error-correcting coding, with a convolutional code based on the tail biting, at the coding rate directed by the control unit 500.

The frame division unit 503 replicates transmitted data subjected to error-correcting coding into each of frames, under a direction from the control unit 500. This operation is the same as the process of repeating the same data at four times and dividing the data into four data elements at each time. In other words, the same transmitted data subjected to error-correcting coding is assigned to each of the frames.

The shift mapping unit 513 cyclically shifts the transmitted data in each of the frames by the predetermined number of bits, for each Output. For example, an 8-bit data row {a0, a1, a2, a3, a4, a5, a6, a7} is converted into {a2, a3, a4, a5, a6, a7, a0, a1} by 2-bit cyclic bit shifting.

The coding rate adjusting unit 504 adjusts the coding rate by executing a repetition (bit repetition) process for an output of the shift mapping unit 513 and adjusting the number of bits of the data signal, on the basis of a parameter directed by the control unit 500.

The in-frame interleaver 512 interleaves an output of the coding rate adjusting unit 504, in each frame, on the basis of the interleaving pattern directed by the control unit 500.

The modulating unit 505 modulates an output of the in-frame interleaver 512 in modulation method M directed by the control unit 500 and generates a data signal represented by a complex value.

The sub-carrier assigning unit 506 generates a signal to be assigned to sub-carriers corresponding, respectively, to the data signal output from the modulating unit 505, and a control signal and a phase reference signal supplied from the control unit 500, under a direction from the control unit 500.

The IFFT unit 507 generates an OFDM signal as a sequence of a plurality of OFDM symbols by processing the signal output from the sub-carrier assigning unit 506 by OFDM modulation. In other words, the IFFT unit 507 generates an OFDM signal by converting a signal of a frequency domain into a signal of a time domain.

The GI adding unit 508 adds guard interval to the OFDM signal output from the IFFT unit 507 and then outputs the OFDM signal.

The radio transmission unit 509 comprises a DA converter configured to process the output of the GI adding unit 508 by digital-to-analog conversion, an up-converter configured to up-convert an output of the D/A converter, and a power amplifier configured to amplify an output of the up-converter. The radio transmission unit 509 generates a radio (RF) signal by these units and transmits the RF signal from an antenna.

The reception system 510 receives the RF signal transmitted from the mobile station and detects quality of the signal received from the mobile station.

The control unit 500 controls all the units of the base station to generate a transmission signal and transmit the transmission signal to the mobile station. In addition, the control unit 500 stores a transmission format table. The control unit 500 selects the transmission format which should be used for the transmission to the mobile station, on the basis of control information (CQI) received from the mobile station by the reception system 510 and the signal quality detected by the reception system 510. Then, the control unit 500 includes MCS information representing the selected transmission format in the control information and transmits the control information to the mobile station.

When the control unit 500 determines the transmission format, the control unit 500 transmits the MCS information representing the determined transmission format to the mobile station. After that, the control unit 500 controls all the units of the mobile station such that the data signal can be transmitted in the determined transmission format.

Figure 20:
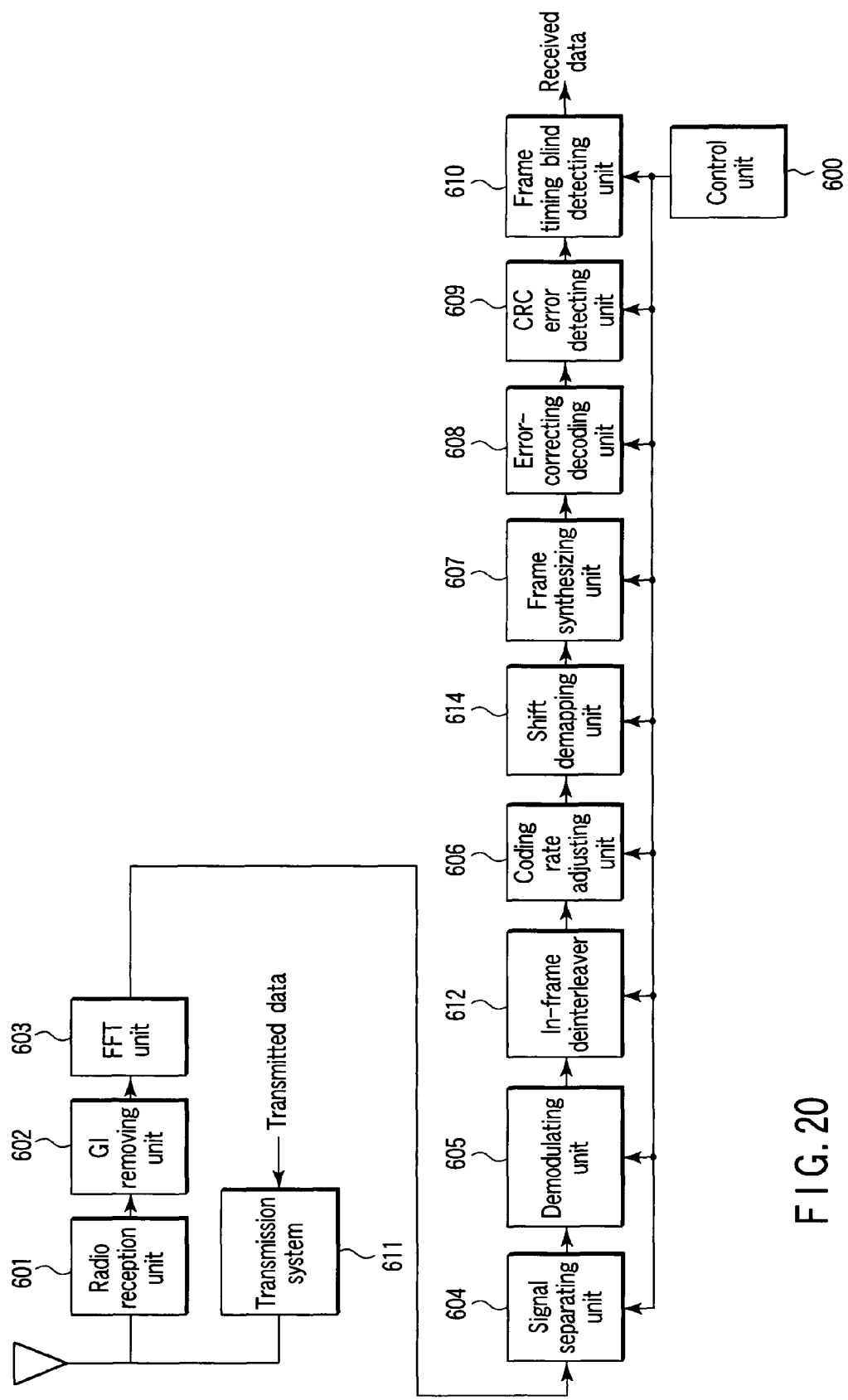
FIG. 20 is a block diagram showing a configuration of a mobile station of the digital communications system according to the third embodiment of the present invention.

Next, a configuration of the mobile station of the cellular system according to the third embodiment will be described. FIG. 20 mainly shows a configuration of a reception system of the downstream line provided in the mobile station. The mobile station establishes communications with a communication partner via the base station and the mobile communications network.

As shown in FIG. 20, the mobile station comprises a control unit 600, a radio reception unit 601, a GI (Guard Interval) removing unit 602, an FFT (fast Fourier transform) unit 603, a signal separating unit 604, a demodulating unit 605, a coding rate adjusting unit 606, a frame synthesizing unit 607, an error-correcting decoding unit 608, a CRC (cyclic redundancy check) error detecting unit 609, a frame timing blind detecting unit 610, a transmission system 611, an in-frame deinterleaver 612 and a shift demapping unit 614.

The radio reception unit 601 comprises a band-pass filter configured to receive the RF signal transmitted from the base station and remove noise in a band outside a desired band, and an AD converter configured to convert a signal passing through the filter into a baseband digital signal.

The GI removing unit 602 removes guard interval from the baseband digital signal output from the radio reception unit 601.

The FFT unit 603 processes the digital signal fro which the guard interval is removed by the GI removing unit 602, by fast Fourier transform, and converts a signal of the time domain into a signal of the frequency domain to divide the signal into signals for the respective sub-carriers.

The signal separating unit 604 separates the signals divided for the respective sub-carriers to the control signal, the phase reference signal, the data signal and the like, and outputs the separated signals to modules corresponding to the respective separated signals.

The demodulating unit 605 obtains a channel estimate value of a sub-carrier frequency from the phase reference signal, processes the output of the signal separating unit 604 by channel equivalence using the channel estimate value, demodulates a result of equivalence in a demodulation method directed by the control unit 600, and thereby regenerates the bit string included in the data signal.

The in-frame deinterleaver 612 corresponds to the in-frame interleaver 512 of the base station, and deinterleaves the data signal obtained by the demodulating unit 605, for each of the frames, on the basis of the interleaving pattern directed by the control unit 600.

The coding rate adjusting unit 606 accumulatively synthesizes signals repeatedly input from the in-frame deinterleaver 612 and outputs them as a single data element, on the basis of a parameter directed by the control unit 600.

The shift demapping unit 614 corresponds to the shift mapping unit 513 of the mobile station, and shifts the transmitted data in each of the frames output from the coding rate adjusting unit 606, at a predetermined number of bits.

The frame synthesizing unit 607 synthesizes the received signals in each of the frames subjected to bit shifting by the shift demapping unit 614, under a direction of the control unit 600.

The error-correcting decoding unit 608 processes the received data synthesized by the frame synthesizing unit 607, by error-correcting decoding, at a coding rate directed by the control unit 600.

The CRC error detecting unit 609 processes the received data decoded by the error-correcting decoding unit 608, by error detection, on the basis of a bit length directed by the control unit 600.

The frame timing blind detecting unit 610 processes the received by cyclic shifting under a direction of the control unit 600, monitors a result of CRC error detection, and detects an initial timing (timing of the leading frame) of the transmission from a shift amount received without errors.

The control unit 600 generates control information including CQI representing an interference level which a quality measuring unit (not shown) obtains from the received signal transmitted from the base station, and transmits the control information to the base station via the transmission system 611. The control unit 600 prestores a transmission format table. In the transmission format table, the MCS information to identify the transmission format corresponds to information such as modulation method M, coding rate R, parameter N to determine the number of repetitions and orthogonalization, and the like.

Then, the control unit 600 detects the MCS information from the control information extracted by the demodulating unit 605, and recognizes that the transmission format which the base station is to use for the transmission to the mobile station is the transmission format represented by the MCS information. The control unit 600 controls all the units of the mobile station by using the parameter corresponding to the MCS information to receive the information transmitted from the base station by referring to the transmission format table. The control unit 600 thereby receives the signal transmitted from the base station in the transmission format.

Next, operations of the digital communications system having the above-explained configuration will be described.

Figure 21:
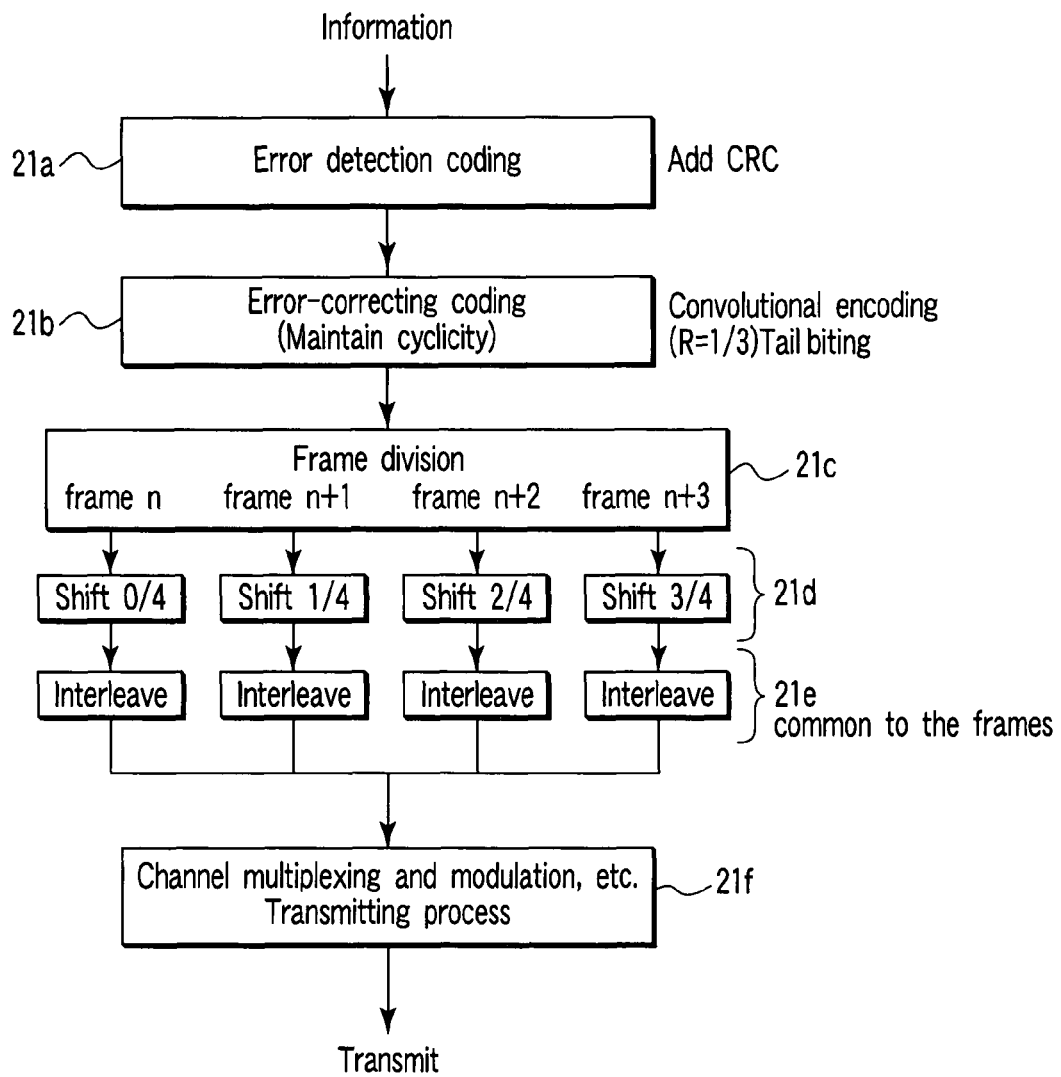
FIG. 21 is a flowchart showing a flow of a process relating to information transmission at the base station shown in FIG. 19.

First, the transmitting operation of the base station will be described. FIG. 21 shows a flow of the main transmission process at the base station. This process is executed by controlling all the units of the base station by the control unit 500. FIG. 22 shows a transition of transmitted data corresponding to the flow.

In step 21a, the control unit 500 controls the CRC adding unit 501 such that the CRC adding unit 501 adds check bits $c_0$-$c_{h-1}$ for error correction to transmitted data $X_0$-$X_{n-1}$ shown in FIG. 22(a), as shown in FIG. 22(b). The control unit 500 proceeds to step 21b.

In step 21b, the control unit 500 controls the error-correcting encoding unit 502 such that the error-correcting encoding unit 502 processes the transmitted data $X_0$-$X_{n-1}$ to which the check bits $c_0$-$c_{h-1}$ for error correction are added as shown in FIG. 22(b), by error-correcting coding (convolutional coding), and thereby obtains three outputs, i.e. Output A, Output B, and Output C as shown in FIG. 22(c). As described in FIG. 2, the information to be encoded (transmitted data $X_0$-$X_{n-1}$ to which the check bits $c_0$-$c_{h-1}$ are added) corresponds in cyclicity to the three outputs Output A, Output B, and Output C by the tail biting.

In step 21c, the control unit 500 controls the frame division unit 503 such that the frame division unit 503 maps the Output A, Output B and Output C on a plurality of frames as shown in FIG. 22(d). For example, the Output A, Output B and Output C are replicated to four frames here. In this case, too, the information to be encoded (transmitted data $X_0$-$X_{n-1}$ to which the check bits $c_0$-$c_{h-1}$ are added) and the Output A, Output B and Output C replicated to four frames correspond in cyclicity.

In step 21d, the control unit 500 controls the shift mapping unit 513 such that the shift mapping unit 513 shifts the data in each of the frames by a predetermined number of bits as shown in FIG. 22(d). Since the number of bits in each of the outputs is g (=n+h) bits, the first frame is shifted by 0/4 of the number of bits, and the second frame is shifted by ¼ of the number of bits, i.e. (g/4) bits in each output, to execute bit shifting of one cycle in four frames. In addition, the third frame is shifted by 2/4 of the number of bits, i.e. (g×2/4) bits in each output, and the fourth frame is shifted by ¾ of the number of bits, i.e. (g×¾) bits in each output. In other words, since the same data is transmitted at four times, the bit row of each output in one frame is divided into four and shifted by each ¼ bits for each output.

In step 21e, the control unit 500 controls the in-frame interleaver 512 such that the in-frame interleaver 512 interleaves the data in each of the shifted four frames, on the basis of an interleaving pattern directed by the control unit 500, and thereby generates four P-BCH as shown in FIG. 22(e). The interleaving pattern applied to each of the frames is common.

In step 21f, the control unit 500 controls the coding rate adjusting unit 504, the modulating unit 505 and the sub-carrier assigning unit 506 to process the P-BCH by channel multiplexing and modulation. The transmission signal thereby obtained is transmitted to the mobile station via the IFFT unit 507, the GI adding unit 508, and the radio transmission unit 509.

Figure 23:
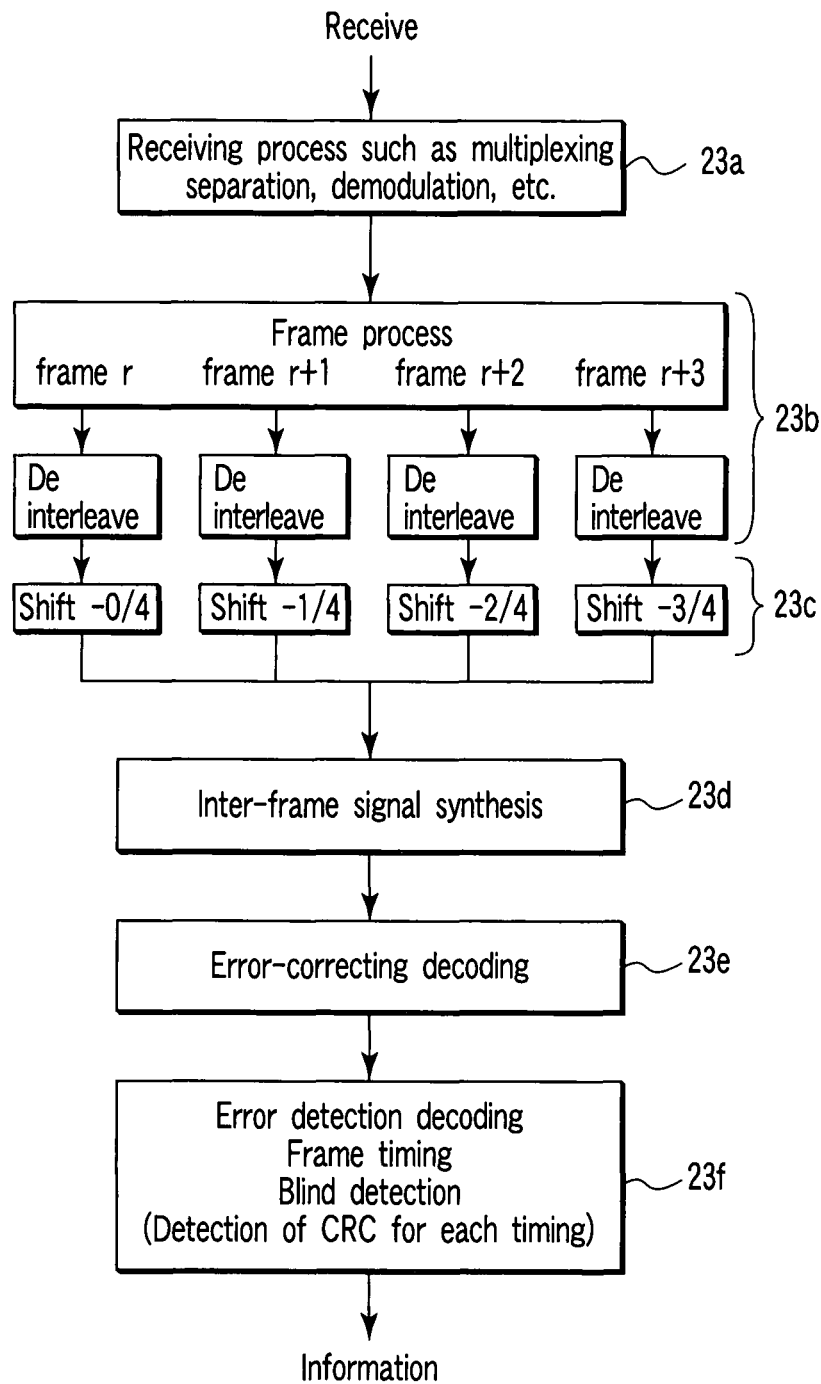
FIG. 23 is a flowchart showing a flow of a process relating to information reception at the mobile station shown in FIG. 20.
Figure 24:
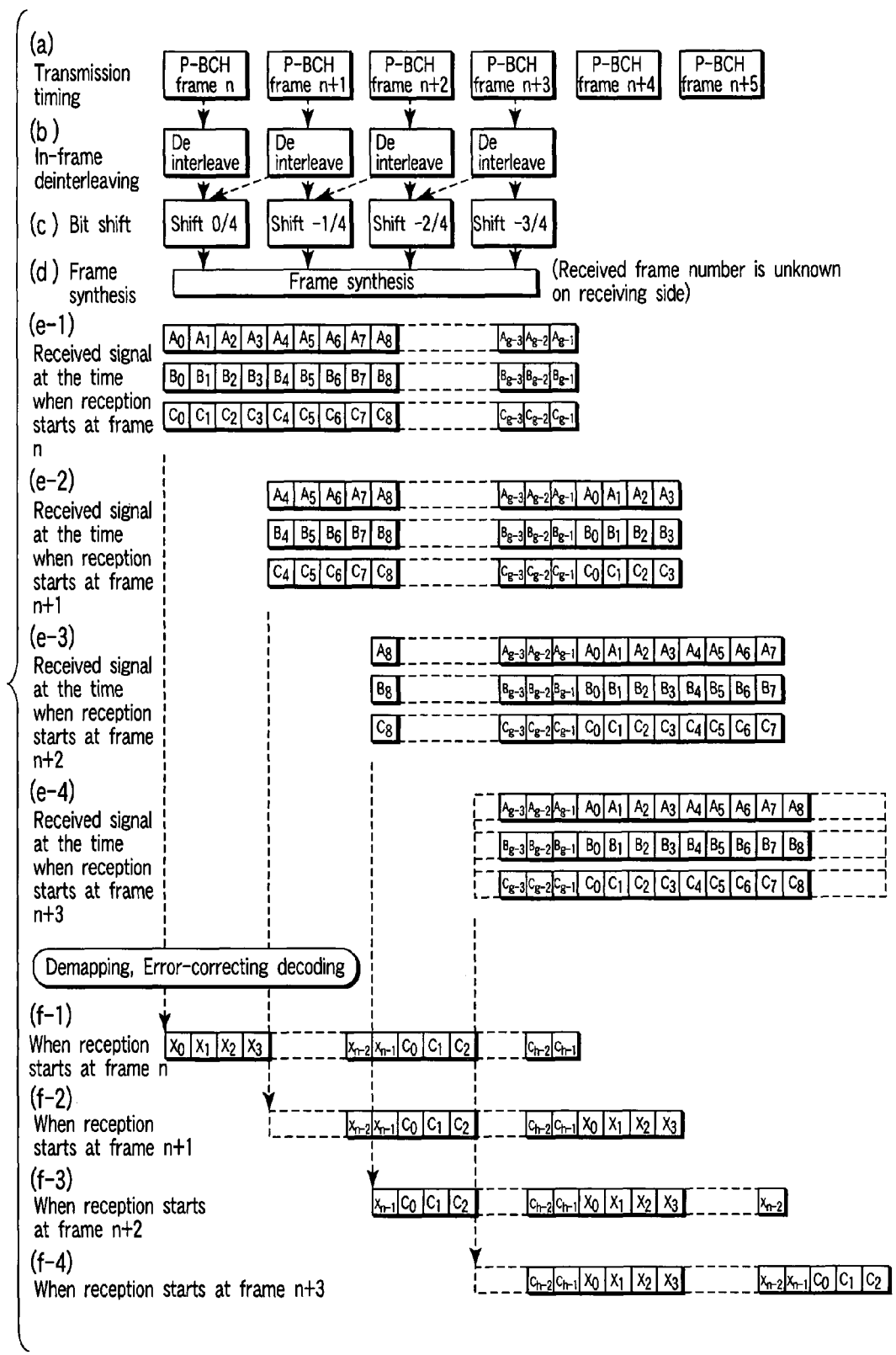
FIG. 24 is an illustration explaining a transition of received data in the flow shown in FIG. 23.

On the other hand, the mobile station executes the following receiving operations. FIG. 23 shows a flow of the main receiving process at the mobile station. This process is executed by controlling all the units of the mobile station by the control unit 600. FIG. 24 shows a transition of received data corresponding to the flow. Detection of the frame timing is executed by the control unit 600, on the basis of the PSC and the SSC of the signals separated by the signal separating unit 604, as already described with reference to FIG. 3.

In step 23a, the control unit 600 controls the signal separating unit 604 such that the signal separating unit 604 separates the P-BCH from the multiplexed received data obtained via the radio reception unit 601, the GI removing unit 602 and the FFT unit 603 as shown in FIG. 24(a). The separated P-BCH are demodulated by the demodulating unit 605 controlled by the control unit 600. Thus, four P-BCH divided for frames are thereby obtained.

In step 23b, the control unit 600 executes the frame process, and controls the in-frame deinterleaver 612 such that the in-frame deinterleaver 612 deinterleaves the P-BCH of the respective frames in a common deinterleaving pattern directed by the control unit 600, as shown in FIG. 24(b).

In step 23c, the control unit 600 controls the coding rate adjusting unit 606 such that the coding rate adjusting unit 606 adjusts the coding rate of the deinterleaved data. Then, the control unit 600 controls the shift demapping unit 614 such that the shift demapping unit 614 shifts the bits of data in each frame, in a direction opposite to the shift mapping unit 513 of the base station, as shown in FIG. 24(c).

In step 23d, the control unit 600 controls the frame synthesizing unit 607 such that the frame synthesizing unit 607 can synthesize the frames of the output of the shift demapping unit 614. In other words, the frame synthesizing unit 607 can synthesize the deinterleaved P-BCH in four frames as shown in FIG. 24(d).

In step 23e, the control unit 600 controls the error-correcting decoding unit 608 such that the error-correcting decoding unit 608 executes decoding corresponding to the encoding at the error-correcting encoding unit 502, and the control unit 600 obtains the received data. As shown in FIG. 24, received data represented by (f-1) to (f-4) are obtained from four signals (e-1) to (e-4) corresponding to start timings of the frame reception.

In step 23f, the control unit 600 controls the CRC error detecting unit 609 such that the CRC error detecting unit 609 sequentially executes CRC detection at four frame timings respectively. The frame timing blind detecting unit 610 detects the timing of the leading frame of the received data composed of four P-BCH, from the detection result.

Figure 25:
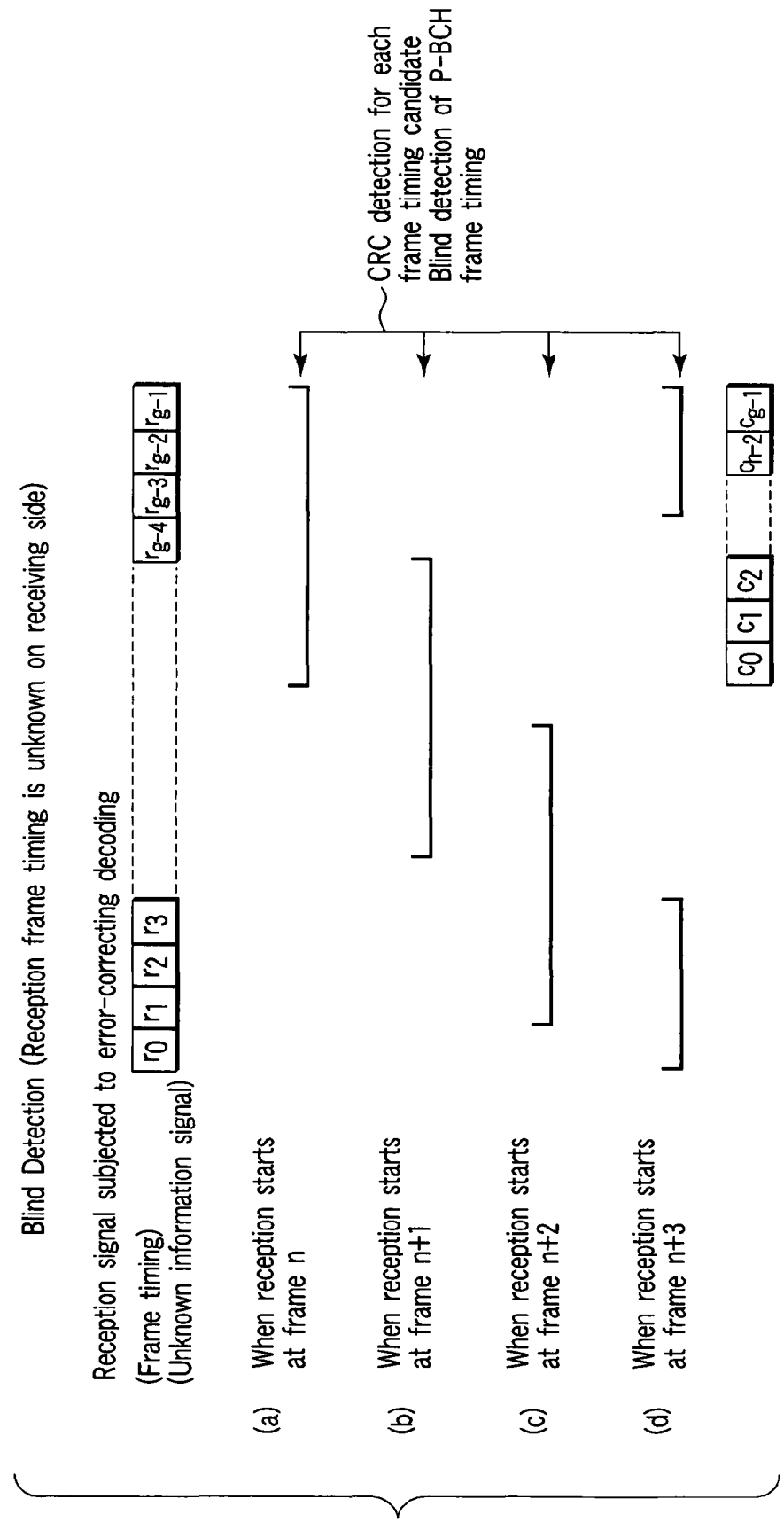
FIG. 25 is an illustration explaining an operation of detecting a leading frame in the flow shown in FIG. 23.

In other words, the frame numbers are unknown on the mobile station side, but four frame timings serving as candidates are detected by the control unit 600 on the basis of the PSC and the SSC. Thus, the CRC error detecting unit 609 executes CRC detection at bit positions corresponding respectively to the four frame timings notified by the control unit 600, as shown in FIG. 25. On the basis of four CRC detection results, the frame timing blind detecting unit 610 detects the cyclic bit shift amount from the position of CRC detection at which normal data are obtained, cuts the check bits from the received data obtained by the error-correcting decoding unit 608 on the basis of this timing, realigns the transmitted data in a determined sequence if necessary, and obtains the data to be transmitted. Since the bit shift amount corresponds to the frame number, the frame number of the frame which starts being received can be obtained.

In the digital communications system having the above-described configuration, after the CRC is added to the transmitted data as the error detection code, the transmitted data is subjected to error-correcting coding using the convolutional code based on the tail biting, and the transmitted data is divided into four P-BCH and transmitted, at the base station. At this time, cyclic bit shift corresponding to the frame number is executed. For this reason, at the mobile station, even if reception is started at any frame of the P-BCH, the cyclic structure of the transmission signal can be maintained by the tail biting, and the received data different in cyclic bit shift amount in frames can be obtained. Therefore, at the mobile station, even if the received leading frame is unknown, decoding can be executed by executing the error-correcting decoding at one time. The decoding result is subjected to CRC detection at four bit positions, the transmitted data is restored, and the leading frame is detected.

Therefore, even if there are a plurality of candidates for the start position of the transmission format, decoding can be executed by executing the error-correcting decoding at one time, and the start position of the transmission format can be thereby detected without processing a great amount of data.

In addition, in the third embodiment, when the base station transmits one frame at four times, the frame is divided into four elements such that the bit row in one frame is the same, and cyclic bit shift is executed by ¼ at each transmission. For this reason, since the cyclic bit shift amount is different according to the frame number, the frame number can be detected at the mobile station. On the other hand, the mobile station shifts the bits of each of the four sequential frames by each ¼, in a direction opposite to the bit shift executed at the base station. For this reason, the received signals in the frames become in the same bit row and the received signals in the frames can be synthesized.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital communications system for data transmission between a transmitting station and a receiving station,
the transmitting station comprising:
a first encoder which executes error detection coding of transmission data and generates data to be transmitted obtained by adding an error detection code to the transmission data;
a second encoder which executes error-correcting coding for the data to be transmitted, with an error-correcting code corresponding to cyclicities of data to be encoded and data encoded;
a frame dividing unit which divides the encoded data obtained by the second encoder into a plurality of frames; and
a transmitter which transmits the data in each of the frames divided by the frame dividing unit,
the receiving station comprising:
a receiver which receives the data in the plurality of frames transmitted from the transmitting station;
a first decoder which executes decoding corresponding to the error-correcting coding executed by the second encoder, for the data in each of the frames received by the receiver, and obtains data having a cyclicity corresponding to a cyclicity of the data to be decoded;
a synthesizer which synthesizes the decoded data in the plurality of frames obtained by the first decoder;
a second decoder which executes decoding corresponding to the encoding executed by the first encoder, for the data synthesized by the synthesizer, by setting a frame boundary as a leading part of the decoding; and
a detector which detects a start position of the transmission data from the synthesized data, in accordance with a result of the decoding of the second decoder,
wherein:
the transmitting station further comprises a first shifter which shifts the data in the frames divided by the frame dividing unit, by a number of bits preset in each frame;
the transmitter transmits the data in each frame bit-shifted by the first shifter;
the receiving station further comprises a second shifter which shifts the decoded data in the plurality of frames obtained by the first decoder, by a number of bits preset in each frame; and
the synthesizer synthesizes the decoded data in the plurality of frames bit-shifted by the second shifter.

2. The system according to claim 1, wherein:
the transmitting station further comprises an in-frame interleaver which interleaves the data in each frame bit-shifted by the first shifter, in each frame;
the transmitter transmits the data in each frame interleaved by the in-frame interleaver;
the receiving station further comprises an in-frame deinterleaver which deinterleaves the decoded data in the plurality of frames obtained by the first decoder; and
the second shifter shifts the decoded data in the plurality of frames deinterleaved by the in-frame deinterleaver, by number of bits preset in each frame.

* * * * *